United States Patent [19]

Takaragi et al.

[11] Patent Number: 4,982,429
[45] Date of Patent: Jan. 1, 1991

[54] ENCIPHER METHOD AND DECIPHER METHOD

[75] Inventors: Kazuo Takaragi, Ebina; Fusao Nakagawa, Yokohama; Ryoichi Sasaki, Fujisawa, all of Japan

[73] Assignees: Hitachi, Ltd., Tokyo; Hitachi Control Systems, Inc., Ibaraki, both of Japan

[21] Appl. No.: 343,808

[22] Filed: Apr. 27, 1989

[30] Foreign Application Priority Data

Apr. 28, 1988 [JP] Japan .................................. 63-103919

[51] Int. Cl.$^5$ .......................... H04L 9/06; H04L 9/28
[52] U.S. Cl. ..................................... 380/028; 380/29; 380/50
[58] Field of Search .............................. 380/9, 22-24, 380/28, 29, 33, 37, 42, 46, 50, 3-5, 25, 49

[56] References Cited

U.S. PATENT DOCUMENTS 4,319,079  3/1982  Best .......................................... 380/4

OTHER PUBLICATIONS

Koyama et al., "Modern Theory of Encryption", The Institute of Electronics and Communications Engineers of Japan; pp. 41-62; Sept., 1986 (in Japanese).
Shimizu et al., "Fast Data Encipherment Algorithm Feal"; Papers of the Institute of Electronics and Communication Engineers of Japan; D. vol. J70-D, No. 7, pp. 1413-1423; Jul., 1987 (in Japanese).

*Primary Examiner*—Stephen C. Buczinski
*Assistant Examiner*—Bernarr Earl Gregory
*Attorney, Agent, or Firm*—Antonelli, Terry, Stout & Kraus

[57] ABSTRACT

There are provided an encipher method of enciphering message data made by a microcomputer or the like at a high speed by using encipher keys which have previously been stored in a smart card or the like and a decipher method of deciphering the ciphertext made by the encipher method at a high speed by using the encipher keys. The encipher method and the decipher method are suitable for, particularly, a 32-bit microcomputer and include a process expressed by the function $Rot_{2i}(x)$ (i=2, 3, 4) in each process. $Rot_{2i}(x)$ is the process to circular shift a data train x of 32 bits to the left or right by $2^i$ bits (i=2, 3, 4).

41 Claims, 13 Drawing Sheets

| 32 | 1  | 2  | 3  | 4  | 5  |
|----|----|----|----|----|----|
| 4  | 5  | 6  | 7  | 8  | 9  |
| 8  | 9  | 10 | 11 | 12 | 13 |
| 12 | 13 | 14 | 15 | 16 | 17 |
| 16 | 17 | 18 | 19 | 20 | 21 |
| 20 | 21 | 22 | 23 | 24 | 25 |
| 24 | 25 | 26 | 27 | 28 | 29 |
| 28 | 29 | 30 | 31 | 32 | 1  |

EXTENSIONAL PERMUTATION TABLE

FIG. 13
PRIOR ART

| SUBSTITUTION TABLE NUMBER | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| [0 0] | 14 | 4 | 13 | 1 | 2 | 15 | 11 | 8 | 3 | 10 | 6 | 12 | 5 | 9 | 0 | 7 |
| [0 1] | 0 | 15 | 7 | 4 | 14 | 2 | 13 | 1 | 10 | 6 | 12 | 11 | 9 | 5 | 3 | 8 |
| [1 0] | 4 | 1 | 14 | 8 | 13 | 6 | 2 | 11 | 15 | 12 | 9 | 7 | 3 | 10 | 5 | 0 |
| [1 1] | 15 | 12 | 8 | 2 | 4 | 9 | 1 | 7 | 6 | 11 | 3 | 14 | 10 | 0 | 6 | 13 |

SUBSTITUTION TABLES OF S. BOX (S1)

ENCIPHER METHOD AND DECIPHER METHOD

BACKGROUND OF THE INVENTION

The present invention relates to an encipher method to encipher a plaintext and to a decipher method to decipher the ciphertext made by the encipher method.

As conventional typical encipher algorithms, the DES algorithm (Data Encryption Algorithm) and the FEAL algorithm (Fast Encryption Standard) have been known. The DES algorithm has been described in detail in, for instance, (1) Koyama et al., "Modern Theory of Encryption", The Institute of Electronics and Communication Engineers of Japan, pages 41 to 49, September 1986. On the other hand, the FEAL algorithm has been described in detail in, (2) Shimizu et al., "Fast Data Encipherment Algorithm FEAL", Papers of the Institute of Electronics and Communication Engineers of Japan, D. Vol. J70-D, No. 7, pages 1413 to 1423, July 1987.

The nonlinear calculation part in the DES process, that is, the process which is called an S (Substitution) box will now be described.

First, in accordance with the DES, algorithm data R ($r_1, r_2, \ldots, r_{32}$) of, for instance, lower 32 bits in an input plaintext of 64 bits is magnified into data R' of 48 bits by an extensional permutation table shown in FIG. 11.

As shown in FIG. 12, the magnified data R' comprises eight blocks $B_1$ to $B_8$ each consisting of six bits.

The data R of 32 bits is divided every four bits. One bit is added before and after the data of four bits. In this manner, each of the blocks ($B_1$ to $B_8$) is constructed by total six bits.

According to the extensional permutation table shown in FIG. 11, as the bits to be added, for instance, as shown by $r_4$ and $r_9$ in block $B_2$ in FIG. 12, the bit ($r_4$) just before the first bit ($r_5$) of the data (bits $r_5$ to $r_8$) obtained by dividing the data R of 32 bits every four bits and the bit ($r_9$) just after the last bit ($r_8$) of the data (bits $r_5$ to $r_8$) are used.

The exclusive OR operation of the data R' of 48 bits obtained as mentioned above and encipher key data K of 48 bits is calculated, thereby converting the data R' into data R'' of 48 bits.

Next, the data R'' is divided into eight blocks ($B'_1$ to $B'_8$) each consisting of six bits. The eight blocks are inputted to eight S boxes (or called selection functions) $S_1$ to $S_8$, respectively.

Each of the S boxes ($S_1$ to $S_8$) has the function for receiving the data of six bits and outputting the data of four bits.

FIG. 13 is a diagram showing a substitution table of the foregoing S box ($S_1$).

The S box ($S_1$) shown in the diagram includes four kinds of substitution tables (substitution table numbers [00] to [11]).

When the 6-bit data of the data R'' is inputted to the S box ($S_1$), the S box ($S_1$) selects one of the four substitution tables in accordance with the first and last bits of the input 6-bit data.

For instance, in the case where data whose bit pattern is indicated by "011011" is used as the input 6-bit data, the S box ($S_1$) selects the substitution table indicated by the bit train "01" comprising a combination of the first bit "0" and the last bit "1" in the data, that is, indicated by the substitution table number [01].

Next, when the central four bits "1101" of the input data are converted into the decimal number, it becomes "13". Therefore, the value "5". indicated by the column 13 of the substitution table "01", that is, "0101" of the binary number is outputted as output data of four bits.

The input data R ($r_1, r_2, \ldots, r_{32}$) is encrypted by executing the above processes of the S box ($S_1$) with respect to the other S boxes ($S_2$ to $S_8$).

In accordance the DES algorithm, by repeating the foregoing processes including the S boxes sixteen times, the plaintext data of 64 bits is finally converted into the ciphertext data of 64 bits.

As shown in the example of the processes mentioned above, the DES algorithm executes the processes of a single bit unit fundamentally.

The nonlinear calculation part in the FEAL process will now be described.

In accordance the FEAL algorithm, for instance, the data R ($r_1, r_2, \ldots, r_{32}$) of lower 32 bits in the input plaintext data of 64 bits is first divided into four block data ($\alpha^0, \alpha^1, \alpha^2, \alpha^3$) every eight bits.

Next, by calculating the exclusive OR of each of the block data and the encipher key data ($\alpha_0$ to $\beta_3$) of eight bits, the block data is respectively converted into intermediate data ($\gamma^0, \gamma^1, \gamma^2, \gamma^3$). Thereafter, the processes by the following function S are executed.

The function S is the function shown by the equation $$S(x_1+x_2+\delta)=Rot_2(w)$$

where,
$w = (x_1 + x_2 + \delta) \bmod 256$
$\delta = 0$ or 1 (constant)

The intermediate data $\gamma^0$ to $\gamma^3$ or the 8-bit data obtained as the result of the processes by the function S are inputted as $x_1$ and $x_2$. On the other hand, the function $Rot_2(w)$ denotes the process to circulate and shift the data w by two bits to the upper or lower bit side.

In accordance with the FEAL algorithm, further, by repeating the foregoing processes eight times for the data obtained as the result of the processes by the function S, the plaintext data of 64 bits is finally converted into the ciphertext data of 64 bits. As shown in the above processes, in the FEAL algorithm, the processes are fundamentally executed in a 8-bit unit basis.

SUMMARY OF THE INVENTION

As the computer.networks have been spread and widely used with the advancement of information processes and communicating technique, it is considered to be an effective measure that data on a transmission path or data stored in the computer is enciphered in order to assure information security for the illegal use, steal, or the like of the data.

The DES algorithm which was determined as a reference of the encryption algorithm in 1977 by the National Bureau of Standard (N.B.S.) is one of the means for enciphering data.

However, in accordance with the DES algorithm as mentioned above, since an amount of processes processing which are is executed on a bit unit basis is extremely large, if such processing is realized by the software of a microcomputer which fundamentally executes the processes on a byte unit basis, it takes a long time to execute the processes and the practical speed is not obtained.

On the other hand, since the FEAL algorithm fundamentally executes the processes on a byte (eight bits) unit basis, if the processes are realized by the 8-bit microcomputer, the high processing speed which is faster by a few times or more than the speed in the DES algorithm can be accomplished. It is considered that the practical speed of a certain extent is obtained by the FEAL by using the software of the 8-bit microcomputer.

However, with the advancement of the recent microelectronics technique, in place of the 8-bit microcomputer, the 16-bit microcomputer and, further, the 32-bit microcomputer is used. It is presumed that the ratio of use of 32-bit microcomputers will fairly increase in the near future. Therefore, it is presumed that the further high encryption processing speed will be required in the age of the 32-bit microcomputer. However, since the 32-bit microcomputer fundamentally executes the processes on a 4-byte unit basis, if the FEAL which was designed for use in the 8-bit microcomputer which fundamentally executes the processes on a one-byte unit basis is intended to realize by the 32-bit microcomputer, it is inefficient.

Therefore, the encryption algorithm for fundamentally executing the processes on a 4-byte unit basis which is suitable for the 32-bit microcomputer is demanded.

It is, therefore, an object of the present invention to provide an encipher method whereby message data made by a microcomputer or the like is enciphered at a high speed.

Another object of the invention is to provide a decipher method whereby the ciphertext made by the encipher method is deciphered at a high speed.

To accomplish the above objects, an encipher method of the invention comprises a first encipherment process for converting upper $2^{n-1}$ bits of original data into first data of $2^{n-1}$ bits which was enciphered; and a second encipherment process for converting lower $2^{n-1}$ bits of the original data into second data of $2^{n-1}$ bits which was enciphered, wherein the first encipherment process includes a first step of converting the lower $2^{n-1}$ bits of the original data into first intermediate data by arithmetically operating with a first encipher key, a second step of converting the first intermediate data into a second intermediate data by circular shifting the first intermediate data to the upper or lower bit side by only $2^i$ bits ($1 \leq i \leq n-3$), and a third step of converting the upper $2^{n-1}$ bits of the original data into the first intermediate data by arithmetically operating with the second intermediate data, and wherein the second encipherment process includes a fourth step of converting the first data into third intermediate data by arithmetically operating with a second encipher key, a fifth step of converting the third intermediate data into fourth intermediate data by circular shifting the third intermediate data to the upper or lower bit side by only $2^j$ bits ($i+1=j \leq n-2$), and a sixth step of converting the lower $2^{n-1}$ bits of the original data into the second data by arithmetically operating with the fourth intermediate data.

Assuming that the lower $2^{n-1}$ bits of the original data are set to $M_2$ and the first encipher key is $K_1$, the first step is expressed by, for instance, the following equations, $$\begin{cases} M_2 + K_1 \to x \\ Rot_2(x) + x + 1 \end{cases}$$

Assuming that the first intermediate data is $x'$, the second step is expressed by, for instance, the following equation, $$Rot_4(x') \oplus x'$$

On the other hand, assuming that the first data is WORK1 and the second encipher key is $K_2$, the fourth step is expressed by, for instance, the following equations, $$\begin{cases} WORK1 + K_2 \to x'' \\ Rot_2(x'') + x'' + 1 \end{cases}$$

Assuming that the third intermediate data is $x'''$, the fifth step is expressed by, for instance, the following equation, $$Rot_8(x''') \oplus x'''$$

The operator "+" included in the above equation denotes the modular addition of modulus $2^{n-1}$, for instance, in the case of $M_2+K_1$ in step 1, the operator "+" denotes the arithmetic operation in which the bit correspondence OR of $M_2$ and $K_1$ is calculated and the bit data is divided by $2^{n-1}$ and the remainder as the result of the division is obtained.

The operator "$\oplus$" denotes the arithmetic operation to get the exclusive OR.

The arithmetic operation function "$Rot_2(x)$" denotes the arithmetic operation to circular shift the data x to the upper or lower bit side by two bits.

Further, in the specification of the present invention, the processes as in the foregoing first and fourth steps are defined as a substitution transformation and the processes as in the foregoing second and fifth steps are defined as a permutation transformation.

According to the foregoing encipher method to which the present invention is applied, as compared with the conventional encipherment process in the DES algorithm, the number of processes for the substitution transformation and permutation transformation can be reduced, so that the encipherment process can be executed at a high speed.

The foregoing and other objects, advantages, manner of operation, and novel features of the present invention will be understood from the following detailed description when read in conjunction with the accompanying drawings.

BRIEF DESCRIPTION OF THE DRAWINGS

FIG. 13 is a diagram showing substitution tables of an S. (Substitution) box $S_1$.

DESCRIPTION OF THE PREFERRED EMBODIMENTS

Figure 1:
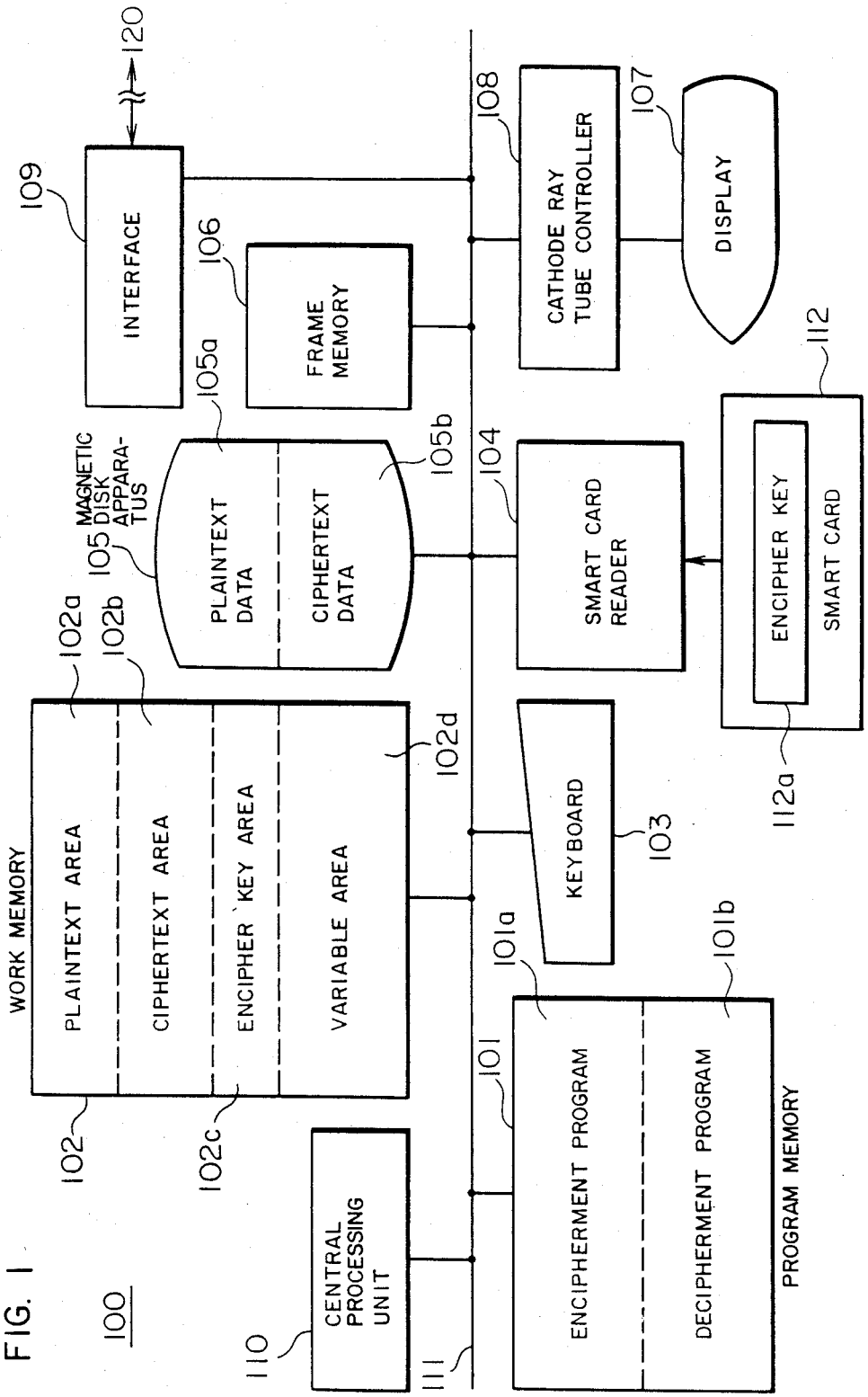
FIG. 1 is a constructional block diagram of a ciphering and deciphering equipment to which the present invention is applied.

FIG. 1 shows a block diagram of a ciphering and deciphering equipment to which the present invention is applied.

A ciphering and deciphering equipment 100 comprises: a program memory 101; a work memory 102; a keyboard 103 to perform a data input or the like; a smart card reader 104; a magnetic disk apparatus 105; a frame memory 106; a display 107 to display characters, symbols, and the like; a cathode ray tube controller (hereinafter, abbreviated as CRTC) 108; an interface 109 to transmit and receive ciphertext to and from the other terminals; and a central processing unit (hereinafter, abbreviated as CPU) 110 to control the above apparatuses through a common bus 111.

On the other hand, an encipherment program 101a to make a ciphertext from a plaintext and a decipherment program 101b to decipher the plaintext from the ciphertext are stored in the program memory 101. An operator can start either one of the programs 101a and 101b by inputting a special command from the keyboard 103.

Further, the work memory 102 includes: a plaintext area 102a to store plaintext data 105a which has previously been stored into the magnetic disk apparatus 105 or the deciphered plaintext data; a ciphertext area 102b to similarly store ciphertext data 105b which has previously been stored into the magnetic disk apparatus 105 or the enciphered ciphertext data; an encipher key area 102c to store encipher keys 112a read out of the smart card by the smart card reader 104; and a variable area 102d to store variables or the like which are used when executing a program.

The ciphering and decipering equipment 100 is connected to the other ciphering and decipering equipment having the same function through a communication network 120 and transmits the ciphertext obtained as the result of the execution of the encipherment program 101a to the other ciphering and deciphering equipment by using the interface 109.

In a manner similar to the above, the ciphering and decipering equipment 100 which received the ciphertext transmitted from the other ciphering and deciphering equipment starts the decipherment program 101b and can obtain the deciphered message.

A ciphering process and the like which are executed by the ciphering and deciphering equipment 100 will now be described.

Figure 2:
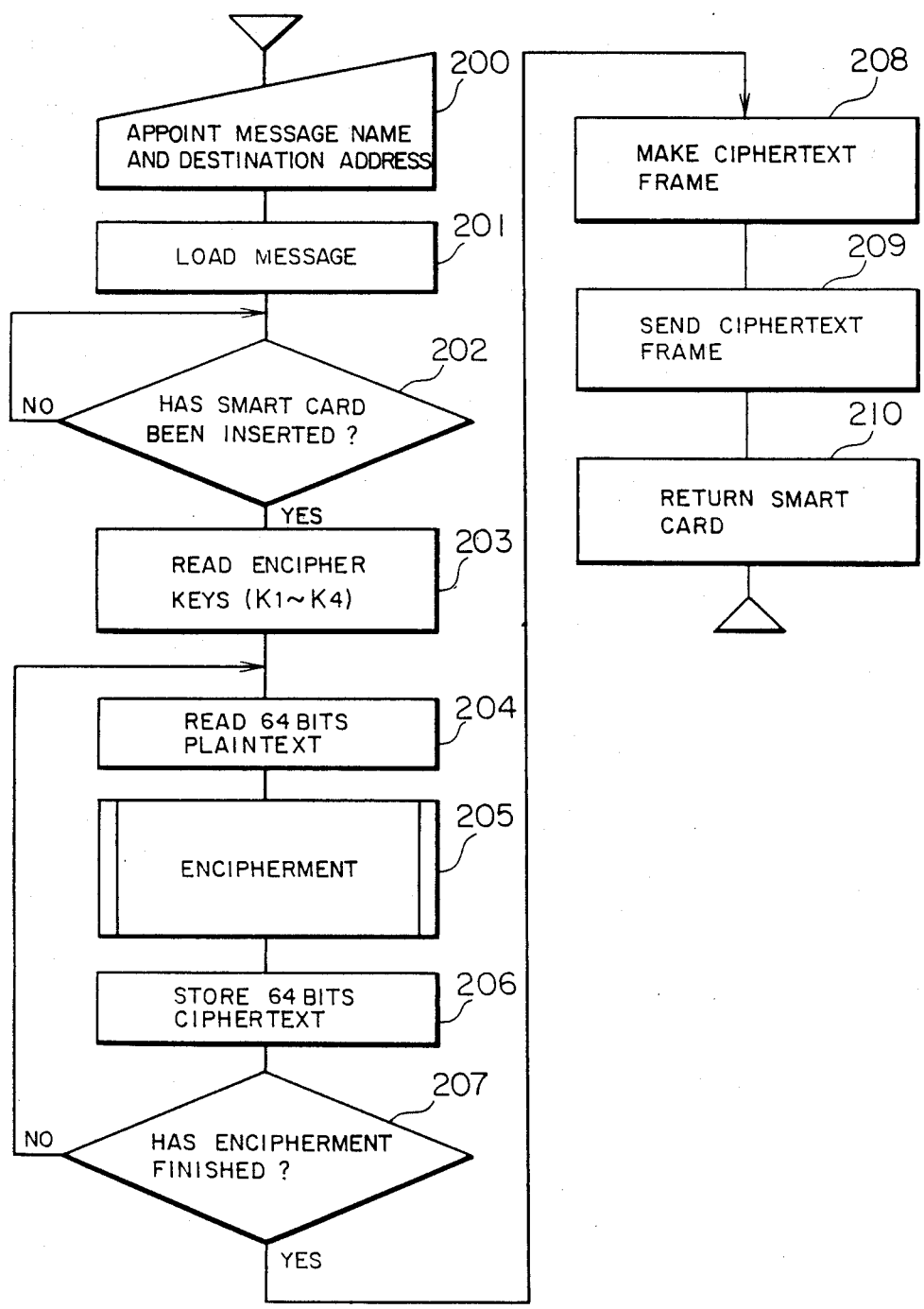
FIG. 2 is a flowchart showing an encipherment process and a ciphertext transmitting procedure according to the invention.

FIG. 2 is a flowchart for the encipherment and transmitting processes which are executed by the ciphering and deciphering equipment 100.

When the operator inputs a special command to the CPU 110 from the keyboard 103, the CPU starts the encipherment program 101a stored in the program memory 101 and sequentially executes the following processes.

When the operator then inputs the name of message to be encrypted and a destination address of the other ciphering and deciphering equipment as a transmission destination side of the ciphertext (step 200), the CPU 110 loads the relevant message from the magnetic disk apparatus 105 into the plaintext area 102a in the work memory 102 and gives an instruction to the CRTC 108 so as to display the message by the CRTC 108 (step 201).

When the display instruction is inputted, the CRTC 108A converts the message stored in the work memory 102 (such a message has been stored in a form of characters, symbols, or codes) into the display data to display on the display 107, stores into the frame memory 106, and displays the display data in the frame memory 106 by the display 107.

On the other hand, when a signal indicative of the insertion of the smart card is inputted from the smart card reader 104 to the CPU 110 (step 202), the CPU progresses the program to step 203. In step 203, the encipher keys 112a ($K_1$ to $K_4$) are read out of an inserted smart card 112 and stored into the work memory 102.

It is assumed that the four encipher keys ($K_1$ to $K_4$) 112a are used and each key includes data of 32 bits which has previously been made.

Next, the plaintext of 64 bits is read out of the message stored in the plaintext area 102a in the work memory 102 and stored into the variable area 102d (step 204) and the encipherment process, which will be explained hereinafter, is executed (step 205).

The CPU 110 stores 64 bits of the ciphertext made in step 205 into the ciphertext area 102b (step 206). If all of the messages in the plaintext area 102a have been encrypted, the encipherment process is finished and if any messages to be encrypted still remain, the processing routine is returned to step 204 in order to encrypt the remaining messages (step 207).

The ciphertexts of the messages are made by the encipherment processes shown in steps 200 to 207 as explained above and stored into the ciphertext area 102b in the work memory 102.

The CPU 110 then instructs the interface 109 so as to make a frame on the basis of the message name which was inputted by the operator in step 200, the ciphertexts made by the processes in steps 200 to 207, and the destination address of the ciphering and deciphering equipment which was inputted by the operator in step 200 (step 208).

When the interface 109 receives the instruction from the CPU 110, the interface makes the ciphertext frame on the basis of the destination address, ciphertexts, and message name and sends the ciphertext frame to the communication network 120 in response to the transmission instruction (step 209) from the CPU 110. On the other hand, the smart card 112 is returned to the operator and the processing routine is finished (step 210).

Figure 3A:
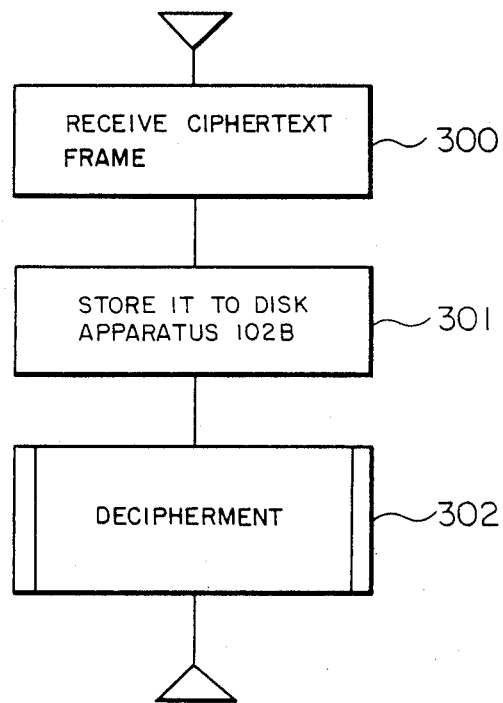
FIGS. 3A and 3B are flowcharts showing a procedure for a decipherment process according to the invention.

FIG. 3A shows a flowchart for the receiving process and the decipherment process of a ciphertext in the case where the ciphering and deciphering equipment 100 has received the ciphertext which had been made by the other ciphering and deciphering equipment by the processes similar to those explained in FIG. 2.

The interface 109 always monitors the ciphertext frame sent from the communication network 120. When the interface 109 received the ciphertext frame including the destination address to its own ciphering and deciphering equipment 100, the interface informs the CPU 110 of the reception of the frame (step 300).

When the CPU 110 receives the notification of the reception of the frame, the CPU makes the message name included in the received ciphertext correspond to the ciphertext and stores them as the ciphertext data 105b into the magnetic disk apparatus 105 (step 301).

When a special decipherment command is inputted from the keyboard 103 to the CPU 110, the CPU starts the decipherment program 101b stored in the program memory 101 and executes the decipherment process of the ciphertext data 105b stored in the disk apparatus 105 (step 302).

Figure 3B:
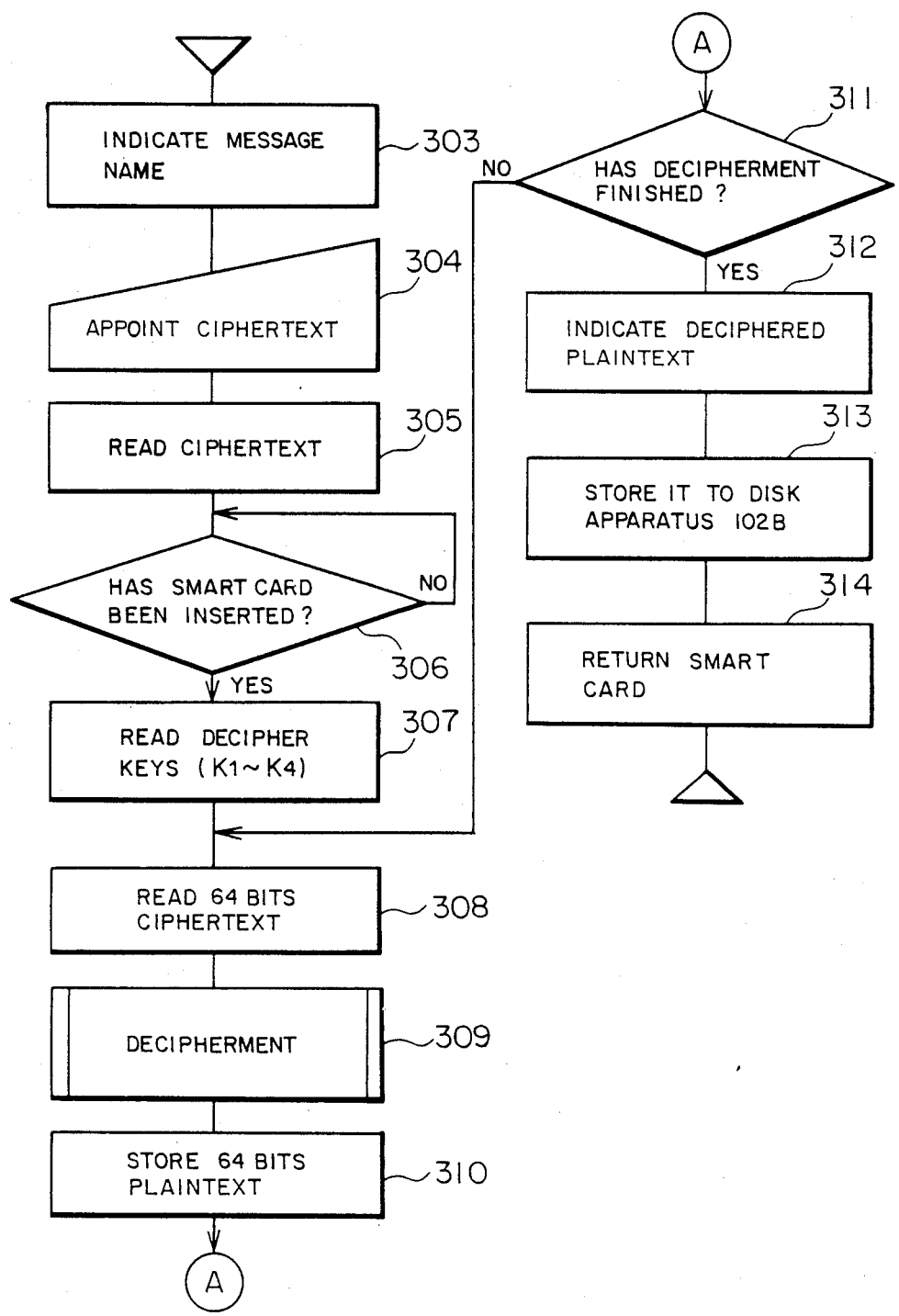

FIG. 3B is a detailed flowchart for the decipherment process of the ciphertext which is executed by the ciphering and deciphering equipment 100.

In step 302, when the decipherment program 101b is started as mentioned above, the CPU 100 accesses the message name of the ciphertext data 105b stored in the disk apparatus 105 into the work memory 102 and instructs the CRTC 108 so as to display the message name (step 303).

When a message name of the ciphertext to be deciphered is appointed by the operator through the keyboard (step 304), the CPU 110 loads the ciphertext corresponding to the appointed message name from the disk apparatus 105 into the ciphertext area 102b in the work memory 102 (step 305).

Next, when the signal indicative of the insertion of the smart card 112 is inputted from the smart card reader 104 to the CPU 110 (step 306), the CPU progresses the program to the next step 307. In step 307, the encipher keys 112a ($K_1$ to $K_4$) are read out of the inserted smart card 112 and stored into the encipher key area 102c in the work memory 102.

Next, the ciphetext of 64 bits is read out from the ciphertext stored in the ciphertext area 102b (step 308) and is subjected to the decipherment process, which will be explained hereinlater (step 309), and the deciphered plaintext is stored into the plaintext area 102a every 64 bits (step 310).

When all of the ciphertexts were deciphered, the decipherment process is finished and when any ciphertexts to be deciphered still remain, the processing routine is returned to step 308 in order to decipher the remaining ciphertexts (step 311).

Next, the CPU 110 instructs the CRTC 108 so as to display the deciphered message in the plaintext area 102a (step 312). The CPU 110 makes the deciphered message correspond to the message name and stores them as the plaintext data 105a into the disk apparatus 105 (step 313). The smart card 112 is returned to the operator (step 314) and the processing routine is finished.

Figure 4:
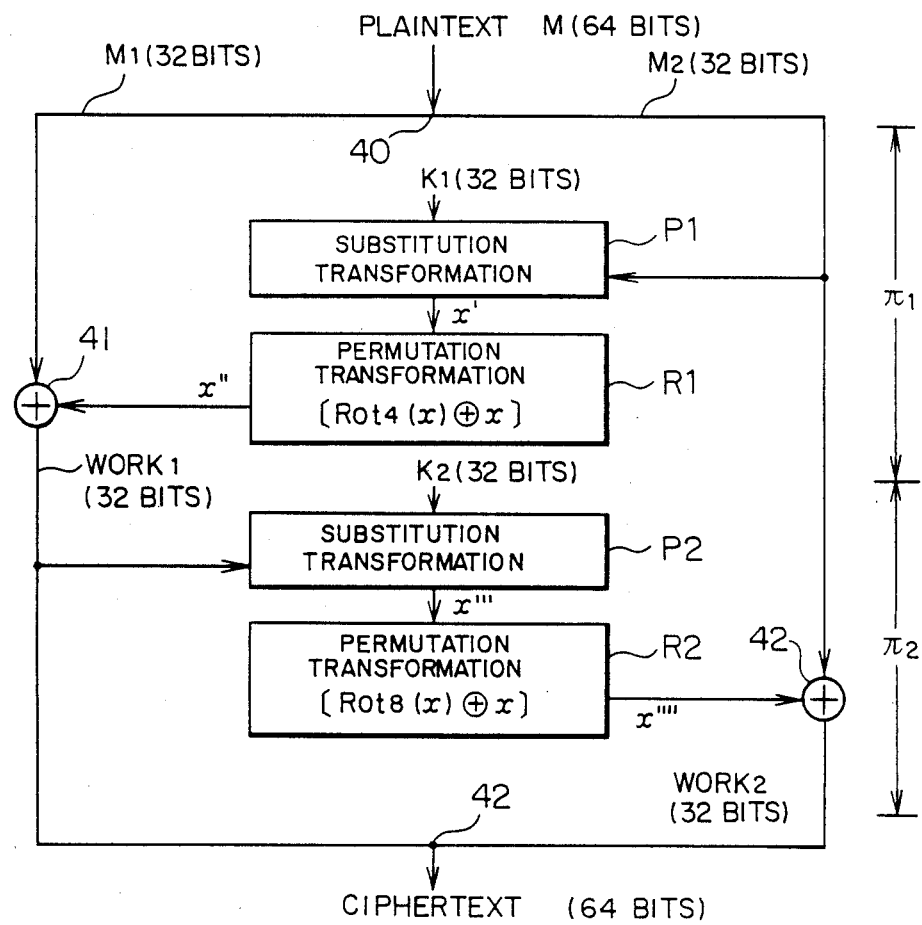
FIG. 4 is a diagram for explaining a simplified outline of the encipherment process to which the invention is applied.

FIG. 4 shows a diagram for explaining a simple outline of the cipherment process (205 in FIG. 2) to which the invention is applied.

The diagram shows a state in which $M_1$ of upper 32 bits and $M_2$ of lower 32 bits in the plaintext M (64 bits) which was read out in step 204 in FIG. 2 are converted into the ciphertext (64 bits) in which upper 32 bits are set to WORK1 and lower 32 bits are set to WORK2 by using the encipher keys $K_1$ and $K_2$.

$P_1$ to $P_2$ and $R_1$ to $R_2$ shown in FIG. 4 denote main processes in the encipherment process to which the invention is applied. The processes $P_1$ to $P_2$ correspond to the foregoing substitution transformation and the processes $R_1$ to $R_2$ correspond to the foregoing permutation transformation.

According to the substitution transformation $P_1$, for instance, the modular addition of the 32-bit data $M_2$ and the encipher key $K_1$ which was read out in step 203 is executed and the resultant data is set to first intermediate data x, the modular addition of the data which is obtained by circular shifting the first intermediate data x to the upper or lower bit side by two bits and the first intermediate data is executed and the resultant data is set to second intermediate data x', and the second intermediate data x' is outputted.

The substitution transformation $P_1$ can be expressed by the following equations.

$$\begin{cases} \text{First intermediate data } x \leftarrow M_2 + K_1 \\ \text{Second intermediate data } x' \leftarrow Rot_2(x) + x + 1 \end{cases}$$

The operator + denotes the modular addition of modulus $2^{32}$. In the above equations, the bit correspondence OR of $M_2$ and $K_1$ is calculated and the result of the OR is divided by $2^{32}$ and the remainder as the result of the division is used as the operator +.

The substitution transformation $P_1$ can be defined as a process such that arbitrary one bit of the message $M_2$ exerts an influence on the four bits of the second intermediate data x' as the result of the output as will be obvious from the above equations.

Next, according to the permutation transformation $R_1$, for instance, third intermediate data x" is made by calculating the exclusive OR of the data which is obtained by circular shifting the second intermediate data x' to the upper or lower bit side by four bits and the second intermediate data x'.

The permutation transformation $R_1$ can be expressed by the following equation.

$$\text{The third intermediate data } x'' \leftarrow Rot_4(x') \oplus x'$$

As mentioned above, the operator $\oplus$ is used to calculate the bit correspondence exclusive OR.

On the other hand, the data $M_1$ is converted into the upper 32 bits (WORK1) of the ciphertext by an arithmetic operating process 41 (exclusive OR) with the third intermediate data x".

The substitution transformation $P_2$ is the process to make fourth intermediate data $x'''$ from at least the WORK1 and the encipher key $K_2$ and can be expressed by the following equation.

Fourth intermediate data $x''' \leftarrow$ WORK1+$K_2$

The permutation transformation $R_2$ is the process to make fifth intermediate data $x''''$ from the fourth intermediate data $x'''$ and can be expressed by the following equation.

Fifth intermediate data $x'''' \leftarrow Rot_8(x''') \oplus x'''$

The data $M_2$ is converted into the lower 32 bits (WORK2) of the ciphertext by an arithmetic operating process 42 (exclusive OR) with the fifth intermediate data $x''''$.

According to the present invention, 64 bits of the plaintext can be converted into 64 bits of the ciphertext by the above-mentioned processes $P_1$ to $P_2$, $R_1$ to $R_2$, and 41 to 42.

However, in the above embodiment, the ratio of the bit having a possibility in which arbitrary one bit among 64 bits of the plaintext exerts an influence on the constructional bits of the ciphertext is merely 16/32.

As a preferred embodiment of the invention, the ciphertext made by the processes $P_1$ to $P_2$ and $R_1$ to $R_2$ is used as an input text and, further, the substitution transformation and permutation transformation as shown in $P_1$ and $R_1$ or $P_2$ and $R_2$ are repeated.

In such a case, it should be noted that the content of the permutation transformation to be repeated includes the process shown by the equation $Rot_{16}(x) \oplus x$. An embodiment in such a case will be described hereinbelow in FIG. 6.

On the other hand, among the foregoing processes, the processes comprising the processes $P_1$, $R_1$, and 41 are defined as a function $\pi_1$ of two inputs and two outputs as shown below and the processes comprising the processes $P_2$, $R_2$, and 42 are defined as a function $\pi_2$ of two inputs and two outputs as shown below.

Thus, the encipherment process shown in FIG. 4 can be expressed as follows.

WORK1, WORK2=$\pi_2 \cdot \pi_1$ ($M_1$, $M_2$)

Therefore, the processes described as a preferred embodiment mentioned above can be expressed by WORK1, WORK2=$\pi'_1 \cdot \pi_2 \cdot \pi_1$ ($M_1$, $M_2$)

As mentioned above, $\pi'_1$ denotes a function including the permutation transformation as shown by $Rot_{16}(x) \oplus x$.

Another embodiment of the encipherment process (step 205 in FIG. 2) will now be described.

Figure 5:
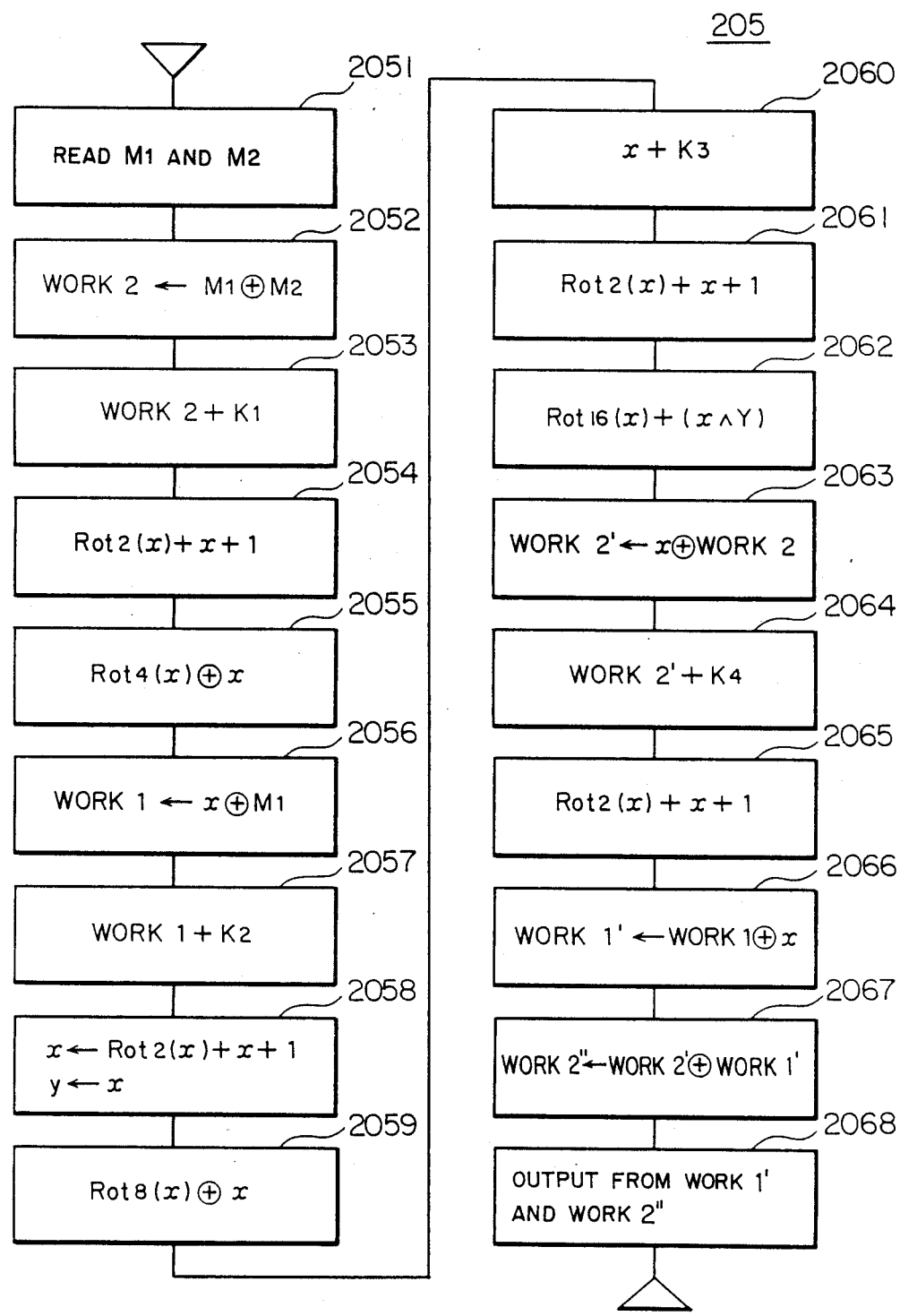
FIG. 5 is a flowchart showing in detail a procedure for the encipherment process according to the invention.

FIG. 5 is a detailed flowchart for the encipherment process (step 205 in FIG. 2) in another embodiment.

In the encipherment process, x, y, WORK1, WORK1', WORK2, WORK2', and WORK2'' are used as variables and the encipher keys $K_1$ to $K_4$ which were read out in step 203 are used as constants.

The CPU 110 divides the plaintext of 64 bits which was read out in step 204 into the plaintext $M_1$ of upper 32 bits and the plaintext $M_2$ of lower 32 bits (step 2051). the bit correspondence exclusive OR of $M_1$ and $M_2$ is calculated and the resultant bit data is stored as WORK2 into the variable area 102d in the work memory 102 (step 2052).

It is now defined hereinafter that the arithmetic operating process shown in step 2052 is expressed by WORK2$\leftarrow M_1 \oplus M_2$ in the specification of the present invention and the operator $\oplus$ is used to calculate the exclusive OR as mentioned above.

In step 2053, the modular addition of the WORK2 obtained in step 2052 and the encipher key $K_1$ is performed and the result of the addition is stored as x into the variable area 102d.

It is now assumed hereinafter that the arithmetic operating process shown in step 2053 is expressed by x$\leftarrow$WORK2+$K_1$ in the specification of the present invention and the operator "+" denotes the modular addition of the modulus $2^{32}$ as mentioned above, that is, the bit correspondence logical OR operation of the WORK2 and $K_1$ is calculated, the resultant bit data is divided by $2^{32}$, and the remainder of the division is used as the operator "+".

In step 2054, the modular addition of the bit data obtained by circular shifting the resultant x to the left by two bits and x and 1 is executed and the result of the addition is stored as x into the variable area 102d.

It is now assumed hereinafter that the arithmetic operating process shown in step 2054 is expressed by x$\leftarrow Rot_2(x)+x+1$ in the specification of the present invention and, in the embodiment, the arithmetic operating function $Rot_2(x)$ circular shifts the data x to the left by two bits. Therefore, $Rot_n(x)$ denotes that the data x is circular shifted to the left by n bits.

In step 2055, the exclusive OR of the bit data obtained by circular shifting the data x obtained in step 2054 to the left by four bits and x is calculated and the resultant data is stored as x into the variable area 102d.

Such an operation can be expressed by the following equation.

x$\leftarrow Rot_4(x) \oplus x$

In the next step 2056, the bit correspondence exclusive OR of the data x obtained in step 2055 and the $M_1$ derived in step 2051 is calculated and the resultant bit data is stored as WORK1 into the variable area 102d.

(Equation: WORK1$\leftarrow x \oplus M_1$)

In step 2057, the modular addition of the WORK1 obtained in step 2056 and the encipher key derived in step 203 is executed and the resultant data is stored as x into the variable area 102d.

(Equation: x$\leftarrow$WORK1+$K_2$)

In step 2058, the modular addition of the bit data obtained by circular shifting the data x obtained in step 2057 to the left by two bits and x and 1 is executed and the resultant data is stored as x into the variable area 102d. The value of x is stored as y into the variable area 102d.

(Equations: $x \leftarrow Rot_2(x)+x+1$, $y \leftarrow x$)

In step 2059, the exclusive OR of the bit data obtained by circular shifting the data x obtained in step 2058 to the left by eight bits and x is calculated and the resultant data is stored as x into the variable area 102d.

(Equation: $x \leftarrow Rot_8(x) \oplus x$)

In step 2060, modular addition of the data x obtained in step 2059 and the encipher key $K_3$ obtained in step 203 is executed and the resultant data is stored as x into the variable area 102d.

(Equation: $x \leftarrow x + K_3$).

In step 2061, the modular addition of the bit data obtained by circular shifting the data x obtained in step 2060 to the left by two bits and x and 1 is performed and the resultant data is stored as x into the variable area 102d.

(Equation: $x \leftarrow Rot_2(x)+x+1$)

In step 2062, the modular addition of the bit data obtained by circular shifting the data x derived in step 2061 to the left by 16 bits and the bit correspondence AND of x and y derived in step 2058 is executed and the resultant data is stored as x into the variable area 102d.

It is now defined hereinbelow that the arithmetic operating process shown in step 2062 is expressed by $$x \leftarrow Rot_{16}(x) + (x \ y)$$

in the specification of the present invention and an operator is used to calculate the bit correspondence AND.

In step 2063, the exclusive OR of the data x obtained in step 2062 and the WORK2 derived in step 2052 is calculated and the resultant data is stored as WORK2' into the variable area 102d.

(Equation: $WORK2' \leftarrow x \oplus WORK2$)

In step 2064, the modular addition of the WORK2' obtained in step 2063 and the encipher key $K_4$ derived in step 203 is performed and the resultant data is stored as x into the variable area 102d.

(Equation: $\leftarrow x \ WORK2' + K_4$)

In step 2065, the modular addition of the bit data obtained by circular shifting the data x derived in step 2064 to the left by two bits and x and 1 is performed and the resultant data is stored as x into the variable area 102d.

(Equation: $x \leftarrow Rot_2(x)+x+1$)

In step 2066, the exclusive OR of the WORK1 obtained in step 2056 and the data x derived in step 2065 is calculated and the resultant data is stored as WORK1' into the variable area 102d.

(Equation: $WORK1' \leftarrow WORK1 \oplus x$)

In step 2067, the exclusive OR of the WORK2' obtained in step 2063 and the WORK1' derived in step 2066 is calculated and the resultant data is stored as WORK2" into the variable area 102d.

(Equation: $WORK2'' \leftarrow WORK2' \oplus WORK1'$)

In step 2068, a ciphertext of 64 bits is made from the WORK1' (32 bits) obtained in step 2066 and the WORK2" (32 bits) derived in step 2067 and an encipherment processing routine 205 (FIG. 2) is finished. Upper 32 bits of the ciphertext are made from the WORK1' and lower 32 bits are made from the WORK2".

Figure 6:
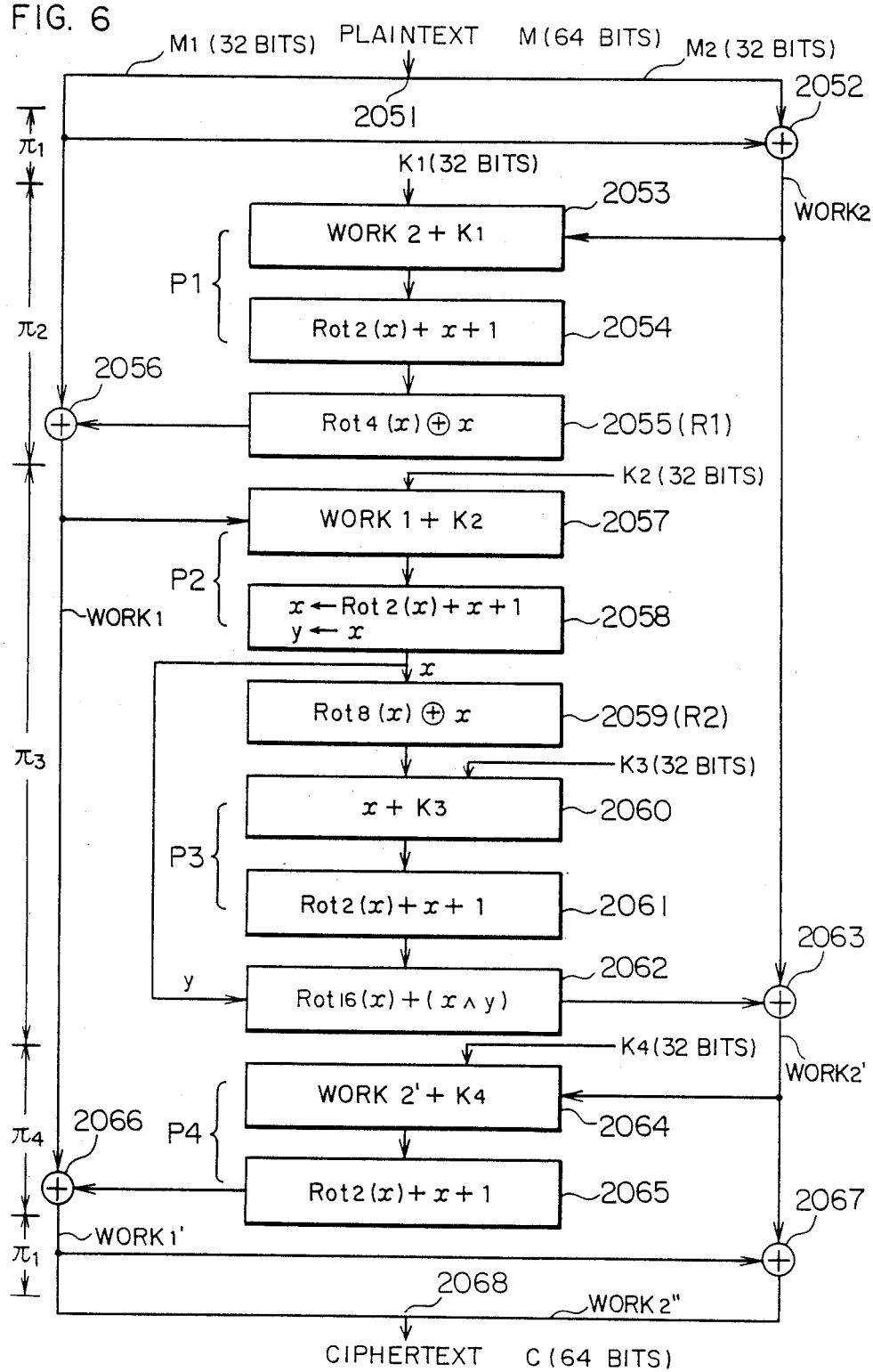
FIG. 6 is a diagram for explaining a step of enciphering a message in the encipherment process shown in FIG. 4.

FIG. 6 is a diagram showing an outline of the encipherment process described in FIG. 5.

In the diagram, a block or the like shown by using a numeral indicates each process in the encipherment process to which the invention is applied. Each process corresponds to each step (steps 2051 to 2068) in the flowchart shown in FIG. 5.

Among the processes in the foregoing encipherment process, the substitution transformations shown by $P_1$ to $P_4$ in the diagram and the permutation transformations shown by $R_1$ to $R_3$ in the diagram are the main processes.

The substitution transformations $P_1$ to $P_4$ are the processes which are mainly based on the substitution transforming function called the modular adding processes of the encipher key $K_1$ to $K_4$ and the like and the data, respectively. The processes $P_1$ to $P_4$ correspond to steps 2053 to 2054 ($=P_1$), steps 2057 to 2058 ($=P_2$), steps 2060 to 2061 ($=P_3$), and steps 2064 to 2065 ($=P_4$) which are expressed by the following equations, respectively.

$$\begin{cases} x \leftarrow WORK \ (or \ x) + K_i \ (i = 1 \ to \ 4) \\ x \leftarrow Rot_2(x) + x + 1 \end{cases}$$

On the other hand, the permutation transformations $R_1$ to $R_3$ are the processes which are mainly based on the permutation transforming functions to circular shift the input data to the left by $2^n$ (n=2, 3, 4) bits, respectively.

The processes $R_1$ to $R_3$ correspond to step 2055 ($=R_1$), step 2059 ($=R_2$), and step 2062 ($R_3$) which are expressed by the following equation, respectively.

$$Rot_{2n}(x) \oplus x (n=2, 3, 4)$$

The relation between the encipherment process and the decipherment process will now be described. The encipherment process can be expressed as a synthetic function of the two-input and two-output functions $\pi_1$ to $\pi_4$ as shown below when excluding the process (step 2051) to read out the upper 32 bits as $M_1$ and the lower 32 bits as $M_2$ from the message M which was read out in step 308 and the process (step 2068) to output the ciphertext C (64 bits) from the WORK1' (32 bits) and the WORK2" (32 bits) obtained in steps 2066 and 2067.

Therefore, the processes in the encipherment process of the embodiment can be shown by the synthetic function such as the following functional equation.

$$C(WORK1', WORK2'') = \pi_1 \cdot \pi_4 \cdot \pi_3 \cdot \pi_2 \cdot \pi_1 \ (M(M_1, M_2))$$

For instance, among the foregoing functions $\pi_1$ to $\pi_4$ in FIG. 5, the function $\pi_1$ corresponds to step 2052 and is the function for receiving $M_1$ (32 bits) and $M_2$ (32 bits) as input values and for outputting $M_1$ and WORK2 as output values.

The function $\pi_2$ corresponds to steps 2053 to 2056 and is the function for receiving $M_1$ and WORK2 as input values and for outputting WORK1 and WORK2 as output values.

The function $\pi_3$ corresponds to steps 2057 to 2063 and is the function for receiving WORK1 and WORK2 as input values and for outputting WORK1 and WORK2' as output values.

The function $\pi_4$ correspond to steps 2064 to 2066 and is the function for receiving WORK1 and WORK2' as input values and for outputting WORK1' and WORK2' as output values.

The function $\pi_1$ corresponds to step 2067 and is the function for receiving WORK1' and WORK2' as input values and for outputting WORK1' and WORK2" as output values.

On the other hand, all of the functions $\pi_i$ (i=1 to 4) have the characteristic such that when the same function transformation is repeated twice, the transformed data value $\pi_i(x)$ is returned to the original data value x, that is $$\pi_i \cdot \pi_i(x) = x$$

Therefore, if the same function is used as a deciphering function of the foregoing decipherment process, the ciphertext C can be deciphered to the original plaintext M.

That is, such a process can be expressed by the following function.

$$M(M_1, M_2) = \pi_1 \cdot \pi_2 \cdot \pi_3 \cdot \pi_4 \cdot \pi_1(C(WORK1', WORK2''))$$

Therefore, the decipherment process 309 (FIG. 3B) can be expressed by a flowchart (not shown) such as to satisfy the function.

Figure 7:
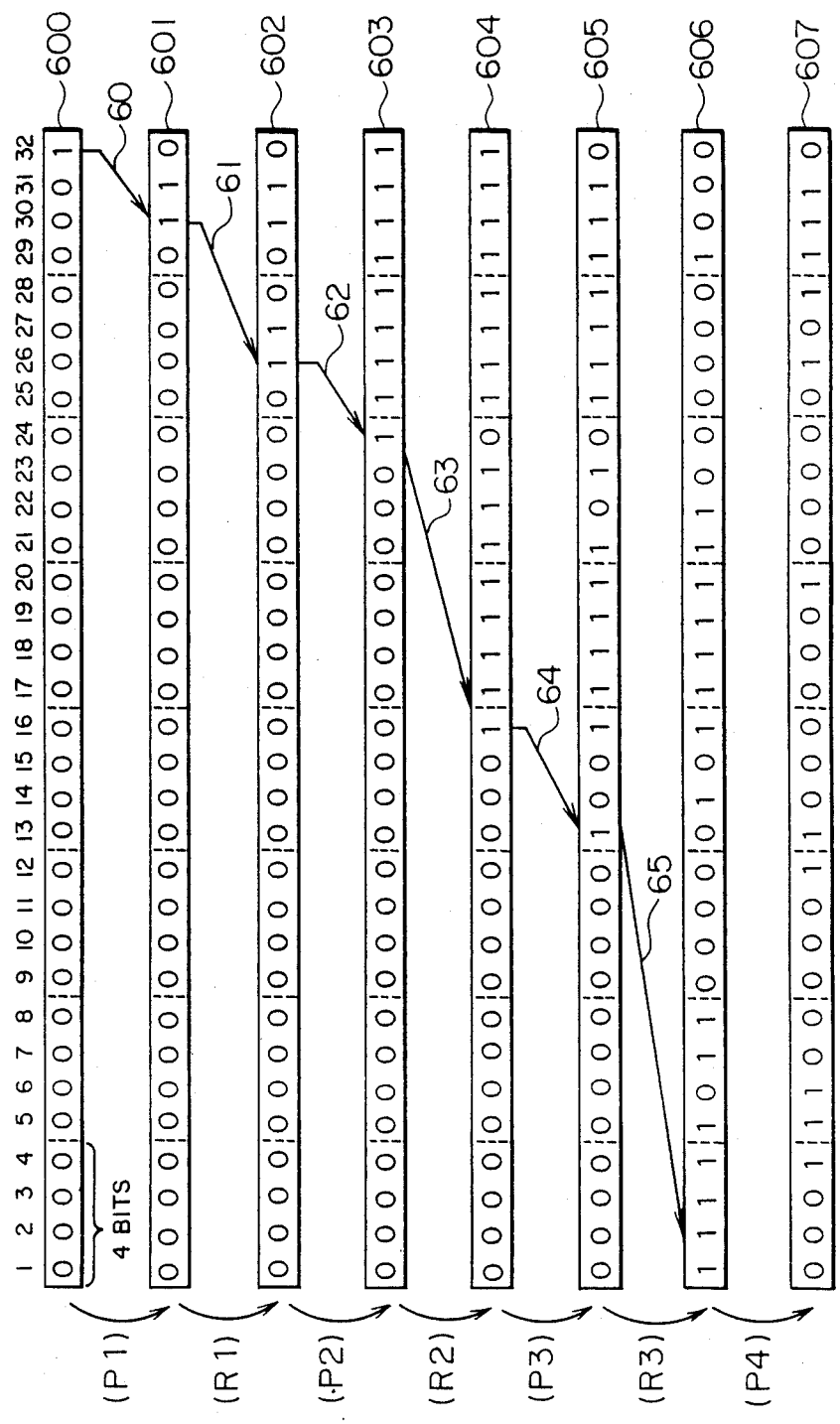
FIG. 7 is a diagram for explaining changes in bit trains of data before and after a substitution transformation and a permutation transformation shown in FIG. 5.

FIG. 7 is a diagram slowing changes in bit trains of the data before and after the substitution transformation ($P_1$ to $P_4$) and the permutation transformation ($R_1$ to $R_3$) in FIG. 6.

To simplify the explanation, the message M which is inputted assumes the data in which only the lest significant bit among 64 bits is set to "1" and all of the other bits are set to "0".

The encipher keys $K_1$ to $K_4$ which are subjected to the modular additions in steps 2053, 2057, 2060, and 2064 assume the data of 32 bits which are all set to "0".

Data 600 is data of the lower bit train $M_2$ obtained in step 2051.

Data 601 is data of the variable x obtained as the result of the processes in steps 2052 to 2054, that is, the substitution transformation $P_1$.

As shown by an arrow 60, "1" of the 32nd bit of the data 600 influences at least the 30th and 31st bits of the data 601.

Data 602 is data of the variable x obtained as the result of the process in step 2055, that is, the permutation transformation $R_1$.

Data 603 is data of the variable x derived by executing the processes in steps 2056 to 2058, that is, the substitution transformation $P_2$ for the data x obtained in step 2055.

Data 604 is data of the variable x obtained as the result of the process in step 2059, that is, the permutation transformation $R_2$.

Data 605 is data of the variable x obtained by executing the processes in steps 2060 to 2061, that is, the substitution transformation $P_3$ for the data 604.

Data 606 is data of the variable x obtained by executing the process in step 2062, that is, the permutation transformation $R_3$ for the data 605.

Data 607 is data of the variable WORK2" obtained as the result of the processes in steps 2063 to 2067, that is, the substitution transformation $P_4$.

Arrows 60 to 65 show states in which "1" of the 32nd bit of the data 600 influences the other bits during each step of the substitution transformation ($P_1$ to $P_4$) and the permutation transformation ($R_1$ to $R_3$).

As will be obviously understood from the diagram, according to the invention, the value "1" of the 32nd bit of the lower bit data $M_2$ in the data 600 in the plaintext M can exert an influence on all of the bits of the data 606 of x obtained as the result of the process in step 2062.

Although the above embodiment has been described with respect to the processes expressed by the function $$C = \pi_1 \cdot \pi_4 \cdot \pi_3 \cdot \pi_2 \cdot \pi \pi_1(M)$$

as the processes for the encipherment process, for instance, the function such that the above function is repeated twice can be also used as a modification. That is, $$C = \pi_1 \cdot \pi_2 \cdot \pi_3 \cdot \pi_4 \cdot \pi_1 \cdot \pi_4 \cdot \pi_3 \cdot \pi_2 \cdot \pi_1(M)$$

In this case, the equation for the dicpherment transformation is $$M = \pi_1 \cdot \pi_2 \cdot \pi_3 \cdot \pi_4 \cdot \pi_1 \cdot \pi_1 \cdot \pi_2 \cdot \pi_3 \cdot \pi_4 \cdot \pi_1(C)$$

Similarly, the function such that the embodiment is repeated n times can be also used as the encipherment transformation.

Further, although the invention has been described with respect to the ciphering and deciphering equipment suitable for the 32-bit microcomputer, it can be also applied to the 16-bit microcomputer.

Figure 8:
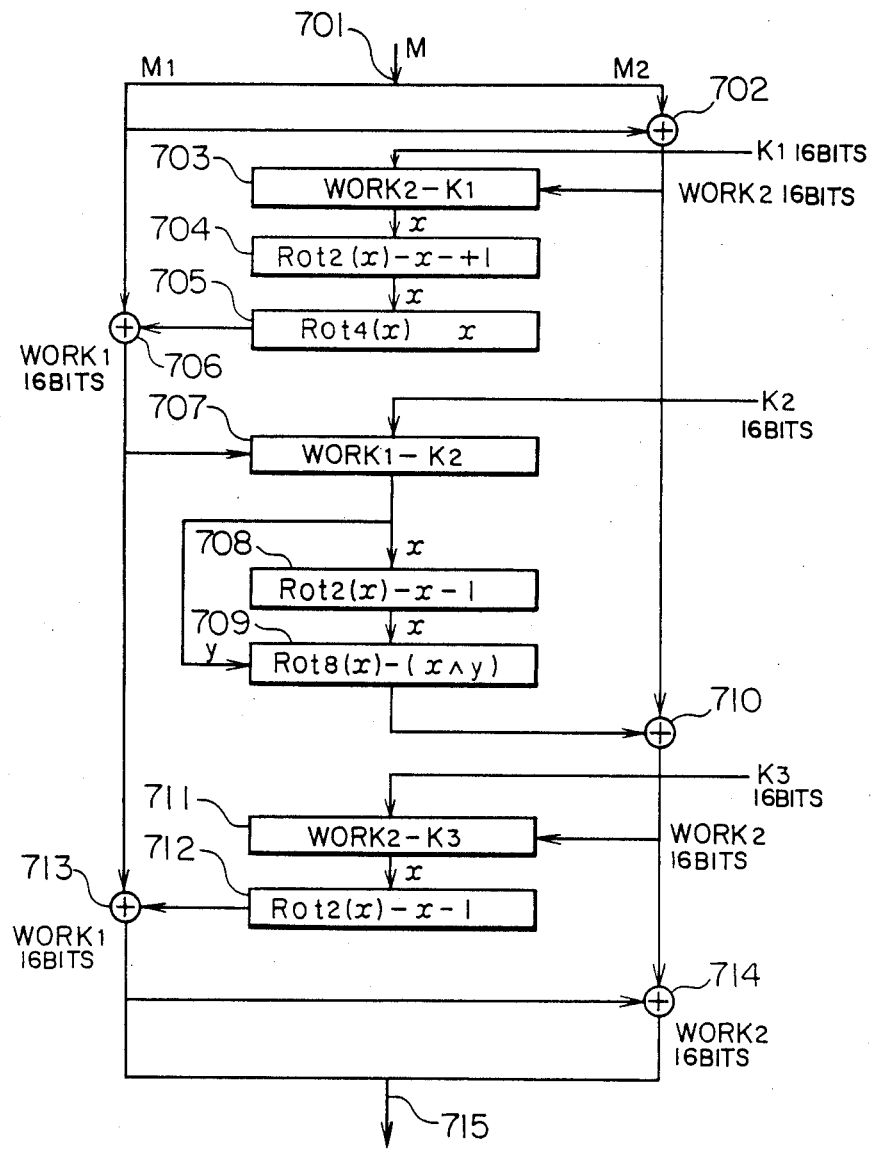
FIG. 8 is a diagram showing an outline of the encipherment process in the case where the invention is applied to a 16-bit microcomputer.

FIG. 8 is a diagram showing the outline of the decipherment process in the case where the invention is applied to the 16-bit microcomputer.

The processes in steps 701 to 715 will be described by mainly using the steps and equations in order to simplify the description.

STEP 701:

The input data M is divided into $M_1$ of upper 16 bits and $M_2$ of lower 16 bits.

STEP 702:

The bit correspondence exclusive OR of $M_1$ and $M_2$ is calculated.

$$WORK2 \leftarrow M_1 \oplus M_2$$

STEP 703:

The modular substitution of the data x and the encipher key $K_1$ is executed.

$$x \leftarrow x - K_1$$

$x - K_1$ denotes the modular subtraction of modulus $2^{16}$ such as to obtain the remainder which is derived by dividing the difference between x and $K_1$ by $2^{16}$.

Hereinafter, "−" denotes the similar process.

STEP 704:

The modular subtraction of the bit data which is obtained by circular shifting the data x to the left by two bits and 1 is executed.

$$x \leftarrow \text{Rot}(x) - x - 1$$

STEP 705:

the exclusive OR of the bit data which is obtained by circular shifting the data x to the left by four bits and the data x is calculated.

$$x \leftarrow \text{Rot}_4(x) \oplus x$$

STEP 706: WORK1 ← $x \oplus M_1$
STEP 707: $x \leftarrow \text{WORK1} - K_2$
  $y \leftarrow x$
STEP 708: $x \leftarrow \text{Rot}_2(x) - x - 1$
STEP 709: $x \leftarrow \text{Rot}_8(x) - (x \quad y)$
STEP 710: WORK2 ← $x \oplus \text{WORK2}$
STEP 711: $x \leftarrow \text{WORK2} - K_3$
STEP 712: $x \leftarrow \text{Rot}_2(x) - x - 1$
STEP 713: WORK1 ← WORK1 $\oplus x$
STEP 714: WORK2 ← WORK2 $\oplus$ WORK1
STEP 715:

The WORK1 is outputted as upper 16 bits of the output data and the WORK2 is outputted as lower 16 bits of the output data.

In the embodiment (FIG. 1), the encipher keys $K_1$ to $K_4$ which are necessary for the encipherment process have been read out of the smart card 112. However, it is also possible to construct in a manner such that the encipher keys are stored as key data into the magnetic disk apparatus 105 and when the encipherment process is executed, the key data is read out and used as the encipher keys.

Further, in the above embodiment, the ciphertext made by the ciphering and deciphering equipment has been sent to the other equipment by using the communication network. However, it is also possible to construct in a manner such that the ciphertext made is written into a memory in the smart card 112 and in the case of deciphering the ciphertext written in the smart card, both of the ciphertext and the encipher key are read out of the smart card.

Figure 9:
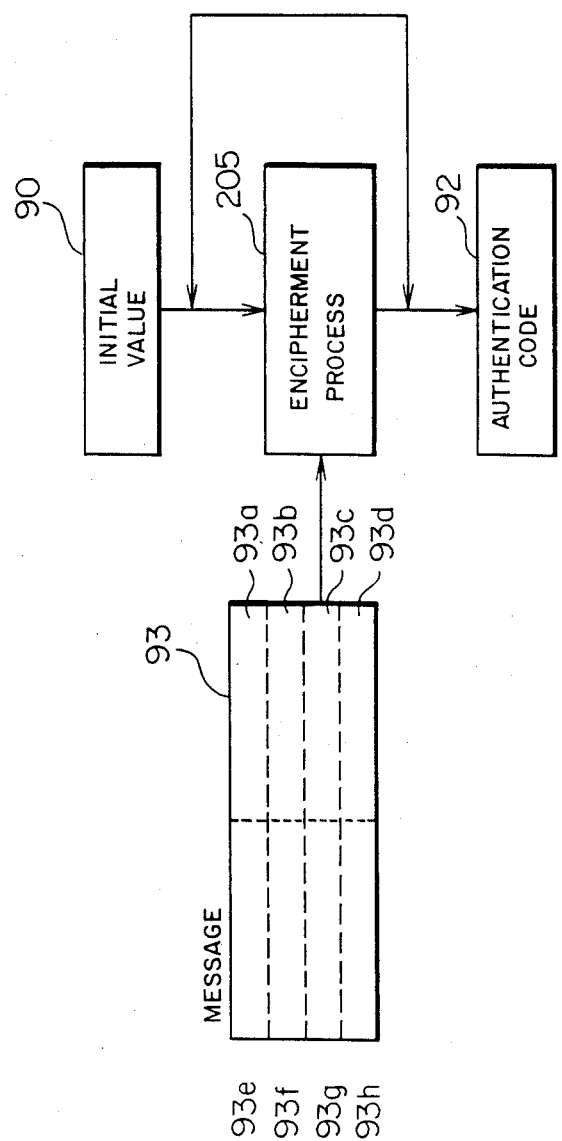
FIG. 9 is a diagram showing an outline of a method of authenticating a received message by using the encipherment process of the invention.

FIG. 9 shows a schematic diagram of an authenticating method of a received message using the encipherment process according to the invention.

(1) A message 93 (for instance, 256 bits × 8 × 32 bits) to be used for the reception authentication is used as key data and an arbitrary initial value 90 (64 bits) is encrypted by using the algorithm 205 according to the invention.

(2) The result 92 of the encryption is again encrypted by data 93e to 93h subsequent to messages 93a to 93d used in the above item (1). Similarly, such an operation is repeated until the end of message.

(3) the final encryption result is outputted as a message authentication code 92.

Figure 10:
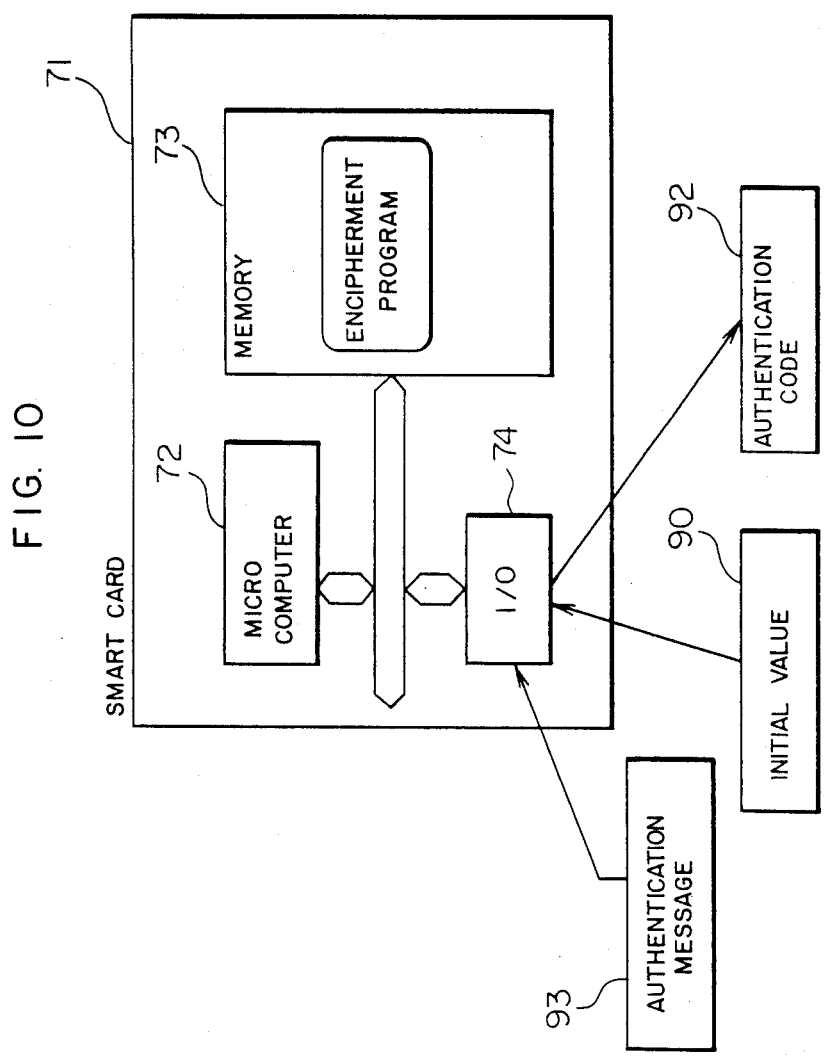
FIG. 10 is a constructional block diagram of a smart card to which the authenticating method of a received message in FIG. 9 is applied.
Figures 11, 12:
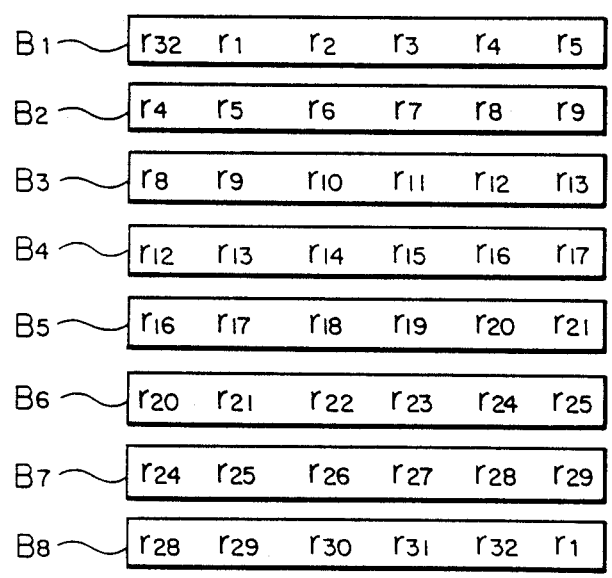
FIG. 11 is a diagram showing an extensional permutation table which is used in the encipherment process of the DES.
FIG. 12 is a diagram showing a bit arrangement of eight block data included in the data made by using the extensional permutation table of FIG. 11.

FIG. 10 shows a block constructional diagram of a smart card to which the authenticating method of a received message which has been described in FIG. 9 is applied.

In FIG. 1, the smart card 112 has only the function to store the encipher keys 112a. Therefore, as mentioned above, the ciphering and deciphering equipment 100 has at least the CPU 110 to execute the program and the program memory 101 to store the encipherment program 101a.

However, a smart card 71 shown in FIG. 10 has: a microcomputer 72 having the same function as the CPU 110; a memory 73 to store the encipherment program 101a; and an I/O 74 to perform the input/output control between the microcomputer 72 and each apparatus in the ciphering and deciphering equipment such as work memory 102, keyboard 103, and magnetic disk apparatus 105.

Therefore, for instance, the case of applying the received message authenticating method shown in FIG. 9 will now be described.

(1) The microcomputer 72 transmits the initial value 90 necessary to authenticate the message from the magnetic disk apparatus 105 to the microcomputer 72 in the smart card 71 through the I/O 74.

(2) In a manner similar to the above item (1), the message 93 to execute the authentication is sequentially transmitted to the microcomputer 72. The microcomputer 72 makes the message authentication code 92 by the decipherment program 101a stored in the memory 73.

As will be understood from the above description (particularly, FIG. 6), according to the encipher method and decipher method of the invention, there is an advantage such that the encipherment process can be performed at a high speed. Similarly, there is an advantage such that the decipherment process can be executed at a high speed.

We claim:

1. An encipher method for enciphering $2^n$ bits of original data into $2^n$ bits of enciphered data by using a plurality of encipher keys, comprising the steps of:

performing a first encipherment process by deriving first data and second data from said original data, each of said first data and second data having $2^{n-1}$ bits;

performing a second encipherment process by converting one of said first data and said second data by using the other of said first data and said second data;

performing a third encipherment process for converting said other of said first data and said second data into fourth data by using said third data; and performing a fourth encipherment process for producing said $2^{n-1}$ bits of enciphered data by using said third data and said fourth data;

wherein said second encipherment process includes:

a first step of converting said other of said first data and said second data into first intermediate data by arithmetically operating on said other of said first data and second data using a first encipher key;

a second step of converting said first intermediate data into second intermediate data by circular shifting of said first intermediate data by $2^i$ bits ($1 \leq i$); and a third step of converting said one of said first data and said second data into said third data by arithmetically operating on said one of said first data and said second data using said second intermediate data;

and wherein said third encipherment process includes:

a fourth step of converting said third data into third intermediate data by arithmetically operating on said third data using a second encipher key;

a fifth step of converting said third intermediate data into fourth intermediate data by circular shifting of said third intermediate data by $2^j$ bits ($i<j$); and a sixth step of converting said other first and second data into said fourth data by arithmetically operating on said other of said first data and said second data using said fourth intermediate data.

2. An encipher method according to claim 1, wherein said sixth step of performing said third encipherment process includes:

a seventh step of converting said fourth intermediate data into fifth intermediate data by arithmetically operating on said fourth intermediate data using a third encipher key;

an eighth step of converting said fifth intermediate data into sixth intermediate data by circular sifting of said fifth intermediate data by $2^k$ bits ($k>j$); and a ninth step of converting said other of said first data and said second data into said fourth data by arithmetically operating on said other of said first data and second data using said sixth intermediate data.

3. An encipher method according to claim 2, wherein said eighth step converts said fifth intermediate data into said sixth intermediate data by using seventh intermediate data which is obtained by circular shifting of said fifth intermediate data $2^k$ bits ($k>j$) and eighth intermediate data which is obtained by arithmetically operating on said third intermediate data using said fifth intermediate data.

4. An encipher method according to claim 1, wherein said fourth encipherment process includes:

a seventh step of converting one of said third and said fourth data into fifth data by arithmetically operating on said one of said third data and said fourth data using the other of said third data and said fourth data; and an eighth step of producing said $2^n$ bits of enciphered data by combining said fifth data and said other of said third data and said fourth data.

5. An encipher method according to claim 1, wherein said fourth encipherment process includes:

a seventh step of converting one of said third data and said fourth data into fifth intermediate data by arithmetically operating on said one of said third data and said fourth data using a fourth encipher key;

an eighth step of converting the other of said third data and said fourth data into fifth data by arithmetically operating on said other of said third data and said fourth data using said fifth intermediate data;

a ninth step of converting said one of said third data and said fourth data into sixth data by arithmetically operating on said one of said third data and said fourth data using said fifth data; and a tenth step of producing said $2^{n-1}$ bits of enciphered data by combining said fifth data and said sixth data.

6. An encipher method according to claim 1, wherein said first encipherment process includes:

a seventh step of converting one of the $2^{n-1}$ upper bits and $2^{n-1}$ lower bits of said $2^n$ bits of original data into said first data by arithmetically operating on said one of said $2^{n-1}$ upper bits and said $2^{n-1}$ lower bits using the other of said $2^{n-1}$ upper bits and $2^{n-1}$ lower bits, said other of said $2^{n-1}$ upper bits and said $2^{n-1}$ lower bits being supplied for use in said second encipherment process as said second data.

7. An encipher method of enciphering $2^n$ bits of original data including $2^{n-1}$ upper bits of said original data and $2^{n-1}$ lower bits of said original data by using a plurality of encipher keys, comprising the steps of:

performing a first encipherment process by converting one of said $2^{n-1}$ upper bits of data and said $2^{n-1}$ lower bits of data into $2^{n-1}$ bits of first enciphered data by using the other of said $2^{n-1}$ upper bits of data and said $2^{n-1}$ lower bits of data; and performing a second encipherment process by converting said other of said $2^{n-1}$ upper bits of data and said $2^{n-1}$ lower bits of data into $2^{n-1}$ bits of second enciphered data by using said $2^{n-1}$ bits of first enciphered data;

wherein said first encipherment process includes:

a first step of converting said other of said $2^{n-1}$ uppers bits of data and said $2^{n-1}$ lower bits of data into first intermediate data by arithmetically operating on said other of said $2^{n-1}$ upper bits of data and said $2^{n-1}$ lower bits of data using a first encipher key;

a second step of converting said first intermediate data into second intermediate data by circular shifting of said first intermediate data by a first predetermined number of bits; and a third step of converting said one of said $2^{n-1}$ upper bits of data and said $2^{n-1}$ lower bits of data into said $2^{n-1}$ bits of first enciphered data by arithmetically operating on said one of said $2^{n-1}$ upper bits of data and said $2^{n-1}$ lower bits of data using said second intermediate data; and wherein said second encipherment process includes:

a fourth step of converting said $2^{n-1}$ bits of first enciphered data into said third intermediate data by arithmetically operating on said $2^{n-1}$ bits of first enciphered data using a second encipher key;

a fifth step of converting said third intermediate data into fourth intermediate data by circular shifting of said third intermediate data by a second predetermined number of bits which is larger than said first predetermined number of bits; and a sixth step of converting said other of said $2^{n-1}$ upper bits of data and said $2^{n-1}$ lower bits of data into said $2^{n-1}$ bits of second enciphered data by arithmetically operating on said other of said $2^{n-1}$ upper bits of data and said $2^{n-1}$ lower bits of data using said fourth intermediate data.

8. An encipher method for enciphering an original data block of $2^n$ bits into an enciphered data block of $2^n$ bits, comprising the steps of:

performing a first process by deriving a first pair of data blocks, each having $2^{n-1}$ bits, from said original data block of $2^n$ bits;

performing a second process by deriving a second pair of data blocks, each having $2^{n-1}$ bits, from said first pair of data blocks;

performing a third process by deriving a third pair of data blocks, each having $2^{n-1}$ bits, from said second pair of data blocks; and performing a fourth process by producing said enciphered data block of $2^n$ bits from said third pair of data blocks;

wherein said second process includes:

a first step of converting one data block of said first pair of data blocks into a first intermediate data block by circular shifting of said one data block by a first predetermined number of bits; and a second step of converting the other data block of said first pair of data blocks into one data block of said second pair of data blocks by arithmetically operating in said other data block of said first pair of data blocks using said first intermediate data block, said one data block of said first pair of data blocks being used in said third process as the other data block of said second pair of data blocks; and wherein said third process includes:

a third step of converting said other data block of said second pair of data blocks into a second intermediate data block by circular shifting of said other data block of said second pair of data blocks by a second predetermined number of bits, which is different from said first predetermined number of bits; and a fourth step of converting said one data block of said second pair of data blocks into one data block of said third pair of data blocks by arithmetically operating on said one data block of said second pair of data blocks by using said second intermediate data block, said other data block of said second pair of data blocks being used in said fourth process as the other data block of said third pair of data blocks.

9. An encipher method for enciphering an original data block of $2^n$ bits into an enciphered data block of $2^n$ bits, comprising the steps of:

performing a first process by deriving a first pair of data blocks, each having $2^{n-1}$ bits, from said original data block of $2^n$ bits;

performing a second process by deriving a second pair of data blocks, each having $2^{n-1}$ bits, from said first pair of data blocks;

performing a third process by deriving a third pair of data blocks, each having $2^{n-1}$ bits, from said second pair of data blocks; and performing a fourth process by deriving said enciphered data block of $2^n$ bits from said third pair of data blocks;

wherein said second process includes:

a first step of converting one data block of said first pair of data blocks into a first intermediate data block by arithmetically operating on said one data block of said first pair;

a second step of converting said first intermediate data block into a second intermediate data block by circular shifting of said first intermediate data block by a first predetermined number of bits; and a third step of converting the other data block of said first pair of data blocks into one data block of said second pair of data blocks by arithimetically operating on said other data block of said first pair of data blocks using said second intermediate data block, said one data block of said first pair of data blocks being used in said third process as the other data block of said second pair of data blocks; and wherein said third process includes:

a fourth step of converting said other data block of said second pair of data blocks into a third intermediate data block by circular shifting of said other data block of said second pair of data blocks by a second predetermined number of bits, which is different from said first predetermined number of bits; and a fifth step of converting said one data block of said second pair of data blocks into one data block of said third pair of data blocks by arithmetically operating on said one data block of said second pair of data blocks using said third intermediate data block, said other data block of said second pair of data blocks being used in said fourth process as the other data block of said third pair of data blocks.

10. An encipher method according to claim 9, wherein said second process includes arithmetically operating on said one data block of said first pair of data blocks using a first encipher key in said first step of converting one data block of said first pair of data blocks into a first intermediate data block, said first encipher key having $2^{n-1}$ bits.

11. An encipher method for enciphering an original data block of $2^n$ into an enciphered data block of $2^n$ bits, comprising the steps of:

performing a first process by deriving a first pair of data blocks, each having $2^{n-1}$ bits, from said original data block of $2^n$ bits;

performing a second process by deriving a second pair of data blocks, each having $2^{n-1}$ bits, from said first pair of data blocks;

performing a third process by deriving a third pair of data blocks, each having $2^{n-1}$ bits, from said second pair of data blocks; and performing a fourth process by deriving said enciphered data block of $2^n$ bits from said third pair of data blocks;

wherein said second process includes:

a first step of converting one data block of said first pair of data blocks into a first intermediate data block by arithmetically operating on said one data block of said first pair of data blocks;

a second step of converting said first intermediate data block into a second intermediate data block by circular shifting of said first intermediate data block by a first predetermined number of bits; and a third step of converting the other data block of said first pair of data blocks into one data block of said second pair of data blocks by arithmetically operating on said other data block of said first pair of data blocks using said second intermediate data block, said one data block of said first pair of data blocks being used in said third process as the other data block of said second pair of data blocks; and wherein said third process includes:

a fourth step of converting said other data block of said second pair of data blocks into a fourth intermediate data block by circular shifting of said third intermediate data block by a second predetermined number of bits, which is different from said first predetermined number of bits; and a sixth step of converting said one data block of said second pair of data blocks into one data block of said third pair of data blocks by arithmetically operating on said one data block of said second pair of data blocks using said fourth intermediate data block, said other data block of said second pair of data blocks used in said fourth process as the other data block of said third pair of data blocks.

12. An encipher method according to claim 11, wherein said third process includes arithmetically operating on said other data block of said second pair of data blocks using a first encipher key in said third step of converting said other data block of said second pair of data blocks into a second intermediate data block, said first encipher key having $2^{n-1}$ bits.

13. An encipher method for enciphering an original data block of $2^\eta$ into an enciphered data block of $2^\eta$ bits, comprising the steps of:

performing a first process by deriving a first pair of data blocks, each having $2^{\eta-1}$ bits, from said original data block of $2^\eta$ bits;

performing a second process by deriving a second pair of data blocks, each having $2^{\eta-1}$ bits, from said first pair of data blocks;

performing a third process by deriving a third pair of data blocks, each having $2^{\eta-1}$ bits, from said second pair of data blocks; and performing a fourth process by deriving said enciphered data block of $2^\eta$ bits from said third pair of data blocks;

wherein said second process includes:

a first step of converting one data block of said first pair of data blocks into a first intermediate data block by circular shifting of said one data block of said first pair of data blocks by a first predetermined number of bits; and a second step of converting the other data block of said first pair of data blocks into one data block of said second pair of data blocks by arithmetically operating on said other data block of said first pair of data blocks using said first intermediate data block, said one data block of said first pair of data blocks being used in said third process as the other data block of said second pair of data blocks; and wherein said third process includes:

a third step of converting said other data block of said second pair of data blocks into a second intermediate data block by arithmetically operating on said other data block of said second pair of data blocks;

a fourth step of converting said second intermediate data block into a third intermediate data block by circular shifting of said second intermediate data block by a second predetermined number of bits, which is different from said first predetermined number of bits; and a fifth step of converting said one data block of said second pair of data blocks into one data block of said third pair of data blocks by arithmetically operating on said one data block of said second pair of data blocks using said third intermediate data block, said other data block of said second pair of data blocks used in said fourth process as the other data block of said third pair of data blocks.

14. An encipher method according to claim 13, wherein said second process includes arithmetically operating on said one data block of said first pair of data blocks using a first encipher key in said first step of converting one data block of said first pair of data blocks into said first intermediate data block; and said third process includes arithmetically operating on said other data block of said second pair of data blocks using a second encipher key in said fourth step of converting said other data block of said second pair of data blocks into said third intermediate data block, each of said first and second encipher keys having $2^{n-1}$ bits.

15. An apparatus for executing an encipher program for enciphering an original data block of $2^n$ bits into an enciphered data block of $2^n$ bits using a plurality of encipher keys, comprising:

a program memory for storing an encipher program for executing a plurality of encipherment processes;

a data file for storing original data and enciphered data produced by executing said encipher program on said original data;

a key register for storing a plurality of encipher keys, each encipher key having $2^{n-1}$ bits;

data registers for successively storing pairs of data blocks produced by executing each of said encipherment processes, each of said data registers having a capacity of $2^{n-1}$ bits;

an accumulator for temporarily storing a data block of $2^{n-1}$ bits read out from one of said data registers for converting said $2^{n-1}$ bits of said data block into an intermediate data block, said intermediate data block being used for enciphering the $2^{n-1}$ bits of said data block in the other of said data registers; and a processor for converting said original data block of $2^n$ bits into an enciphered data block of $2^n$ bits, and for storing said enciphered data block in said data file by executing said encipherment processes of said encipher program;

wherein said encipherment processes include:

a first encipherment process for deriving a first pair of data blocks from said original data block of $2^n$ bits read from said data file, and for storing said first pair of data blocks respectively in said data registers;

a second encipherment process for converting one of said first pair of data blocks into a first data block using the other of said first pair of data blocks, and storing said first data block and said other of said first pair of data blocks in said data registers as a second pair of data blocks;

a third encipherment process for converting one of said second pair of data blocks into a second data block using the other of said second pair of data blocks, and for storing said second data block and said other of said second pair of data blocks in said data registers as a third pair of data blocks; and a fourth encipherment process for deriving said enciphered data block of $2^n$ bits from said third pair of data blocks, and for storing said enciphered data block in said data file;

said second encipherment process including:

a first step of storing said other of said first pair of data blocks in said accumulator, and converting said other of said first pair of data blocks into first intermediate data by arithmetically operating on said other of said first pair of data blocks using a first encipher key read out from said key register;

a second step of converting said first intermediate data into second intermediate data by circular shifting of said first intermediate data by $2^i$ bits ($1 \leq i$) in said accumulator means; and a third step of converting said one of said first pair of data blocks into said first data block in a data register by arithmetically operating on said one of said first pair of data blocks using said second intermediate data; and said third encipherment process including:

a fourth step of storing said other of said second pair of data blocks in said accumulator, and converting said other of second pair of data blocks into third intermediate data by arithmetically operating on said other data block of said second pair or data blocks using a second encipher key read out from said key register;

a fifth step of converting said third intermediate data into fourth intermediate data by circular shifting of said third intermediate data by $2^j$ bits ($i<j$) in said accumulator register; and a sixth step of converting one of said second pair of data blocks into said second data block in said data register by arithmetically operating on said one of said second pair of data blocks using said fourth intermediate data.

16. An apparatus according to claim 15, wherein said first encipherment process includes:

a seventh step of converting the lower $2^{n-1}$ bits of said original data block of $2^n$ bits into one of said first pair of data blocks by arithmetically operating on the upper $2^{n-1}$ bits of said original data block using said $2^{n-1}$ lower bits of said original data block, said $2^{n-1}$ upper bits of said original data block being used in said second encipherment process as the other of said first pair of said data blocks.

17. An apparatus according to claim 15, wherein said first encipherment process includes:

a seventh step of converting the upper $2^{n-1}$ bits of said $2^n$ bits of said original data block into one of said first pair of data blocks by arithmetically operating on the $2^{n-1}$ lower bits of said $2^n$ bits of said original data block using said upper $2^{n-1}$ bits of said original data block, said $2^{n-1}$ lower bits of said original data block being used in said second encipherment process as the other of said first pair of data blocks.

18. An apparatus according to claim 15, wherein said sixth step of said third encipherment process includes:

a seventh step of converting said fourth intermediate data into fifth intermediate data in said accumulator by arithmetically operating on said fourth intermediate data using a third encipher key read out from said key register;

an eighth step of converting said fifth intermediate data into sixth intermediate data by circular shifting of said fifth intermediate data by $2^k$ bits ($k>j$) in said accumulator; and a ninth step of converting said one of said second pair of data blocks into said second data by arithmetically operating on said one of said second pair of data blocks using said sixth intermediate data.

19. An apparatus according to claim 18, wherein, in said eighth step, said processor converts said fifth intermediate data into said sixth intermediate data by using seventh intermediate data which is obtained by circular shifting of said fifth intermediate data by $2^k$ bits ($k>j$) and eighth intermediate data which is obtained by arithmetically operating on said fifth intermediate data using said third intermediate data.

20. An apparatus according to claim 15, wherein said fourth encipherment process includes:

a seventh step of converting one of said third pair of data blocks into third data by arithmetically operating on said one of said third pair of data blocks using the other of said third pair of data blocks; and an eighth step of producing said enciphered block of $2^n$ bits by combining said third data and said other of said third pair of data blocks.

21. An apparatus according to claim 15, wherein said fourth encipherment process includes:

a seventh step of converting one of said third pair of data blocks into fifth intermediate data by arithmetically operating on said one of said third pair of data blocks using a fourth encipher key read out from said key register;

an eighth step of converting the other of said third pair of data blocks into a third data block by arithmetically operating on said other of said third pair of data blocks using said fifth intermediate data, said third data block and said one of said third pair of data blocks being stored as a fourth pair of data blocks in said data registers;

a ninth step of converting one of said fourth pair of data blocks into fourth data by arithmetically operating on said one of said fourth pair of data blocks using the other of said fourth pair of data blocks; and a tenth step of producing said enciphered data block of $2^n$ bits by combining said fourth data and said other of said fourth pair of data blocks.

22. An apparatus according to claim 15, wherein said program memory stores a decipher program for executing a plurality of decipherment processes, and said processor operates to convert enciphered data of $2^n$ bits into original data of $2^n$ bits;

said decipherment process including:

a first decipherment process for deriving a fourth pair of data blocks from said enciphered data block of $2^n$ bits read from said data file, and for storing said fourth pair of data blocks in said data registers;

a second encipherment process for converting one of said fourth pair of data blocks into a third data block by using the other of said fourth pair of data blocks, and for storing said third data block and said other of said fourth pair of data blocks in said data registers as a fifth pair of data blocks;

a third decipherment process for converting one of said fifth pair of data blocks into a fourth data block by using the other of said fifth pair of data blocks, and for storing said fourth data block and said other of said fifth pair of data blocks in said data registers as a sixth pair of data blocks; and a fourth decipherment process for deriving the original data block of $2^n$ bits from said sixth pair of data blocks, and for storing said original data block in said data file;

said second decipherment process including:

a seventh step of storing the other of said fourth pair of data blocks in said accumulator, and converting said other of said fourth pair of data blocks into fifth intermediate data by arithmetically operating on said other of said fourth pair of data blocks using said second encipher key;

an eighth step of converting said fifth intermediate data into sixth intermediate data by circular shifting of said fifth intermediate data by $2^j$ bits in said accumulator; and a ninth step of converting said one of said fifth pair of data blocks into said third data block in said data registers by arithmetically operating on said one of said fifth pair of data blocks using said sixth intermediate data;

and said third decipherment process including:

a tenth step of storing said other of said fourth pair of data blocks in said accumulator, and converting said other of said fourth pair of data blocks into seventh intermediate data by arithmetically operating on said other data block of said fourth pair of data blocks using said first encipher key;

an eleventh step of converting said seventh intermediate data into eighth intermediate data by circular shifting of said seventh intermediate data by $2^i$ bits in said accumulator; and a twelfth step of converting said one of said fourth pair of data blocks into said fourth data block in said data registers by arithmetically operating on said one of said fourth pair of data blocks using said eighth intermediate data.

23. An apparatus according to claim 15, wherein said apparatus further comprises a device for reading said plurality of encipher keys from a smart card which is constructed to be portable by a user.

24. An apparatus for executing a plurality of encipherment processes for enciphering original data of $2^n$ bits into enciphered data of $2^n$ bits, comprising:

a memory for storing original data, enciphered data produced by executing said encipherment processes on said original data, and a pair of data blocks produced from original data of $2^n$ bits by executing said encipherment processes, each of said data blocks having $2^{n-1}$ bits;

an accumulator for storing one of said pair of data blocks read out from said memory, said one data block being converted into an intermediate data block by executing said encipherment processes; and processing means for converting an original data block of $2^n$ bits into an enciphered data block of $2^n$ bits by executing said encipherment processes;

wherein said encipherment processes include:

a first encipherment process for deriving a first pair of data blocks from said original data block of $2^n$ bits;

a second encipherment process for storing said one of said first pair of data blocks in said accumulator, converting said one of said first pair of data blocks into first intermediate data by arithmetically operating on said one of said first pair of data blocks, converting said first intermediate data into second intermediate data by circular shifting of said first intermediate data by a first predetermined number of bits in said accumulator, and converting the other of said first pair of data blocks into a first data block by arithmetically operating on said other of said first pair of data blocks using said second intermediate data, said first data block and said one of said first pair of data blocks being stored in said memory as a second pair of data blocks;

a third encipherment process for storing one of said second pair of data blocks in said accumulator, converting said one of said second pair of data blocks into third intermediate data by arithmetically operating on said other data block of said second pair of data blocks, converting said third intermediate data into fourth intermediate data by circular shifting of said third intermediate data in said accumulator by a second predetermined number of bits, which are different from said first predetermined number of bits, and converting the other of said second pair of data blocks into a second data block by arithmetically operating on said other of said second pair of data blocks using said fourth intermediate data, said second data block being stored in said memory as a third pair of data blocks; and a fourth encipherment process for deriving an enciphered data block of $2^n$ bits from said third pair of data blocks.

25. An apparatus according to claim 24, wherein said first encipherment process includes:

a step of converting the $2^{n-1}$ lower bits of said original data block of $2^n$ bits into one of said first pair of data blocks by arithmetically operating on said $2^{n-1}$ lower bits of said original data block using the $2^{n-1}$ upper bits of said original data block, said $2^{n-1}$ upper bits of said original data block being used in said second encipherment process as the other of said first pair of data blocks.

26. An apparatus according to claim 25, wherein said fourth encipherment process includes:

a step of storing one of said third pair of data blocks into fifth intermediate data by arithmetically operating on said one of said third pair of data blocks;

a step of converting the other of said third pair of data blocks into third data by arithmetically operating on said other of said third pair of data blocks using said fifth intermediate data, said third data and said one of third pair of data blocks being stored as a fourth pair of data blocks in said memory means;

a step of converting one of said fourth pair of data block into fourth data by arithmetically operating on said one of said fourth pair of data blocks using the other of said fourth pair of data blocks; and a step of producing said enciphered data block of $2^n$ bits by combining said fourth data and said other of said fourth pair of data blocks.

27. An apparatus according to claim 24, wherein said first encipherment process includes:

a step of converting the $2^{n-1}$ upper bits of said original data block of $2^n$ bits into one of said first pair of data blocks by arithmetically operating on the $2^{n-1}$ upper bits of said original data block using the $2^{n-1}$ lower bits of said original data block, said $2^{n-1}$ lower bits of said original data block being used in said second encipherment process as the other of said first pair of data blocks.

28. An apparatus according to claim 24, wherein said fourth encipherment process includes:

a step of converting one of said third pair of data blocks into third data by arithmetically operating on said one of said third pair of data blocks using the other of said third pair of data blocks; and a step of producing said enciphered data block of $2^n$ bits by combining said third data and said other of said third pair of data blocks.

29. An apparatus according to claim 24, wherein said processing means uses a first encipher key in said second encipherment process for converting said one of said first pair of data blocks into said first intermediate data, and said processing means uses a second encipher key in said third encipherment process for converting said one of said second pair of data blocks into said third intermediate data, each of said first and second encipher keys being stored in said memory.

30. An apparatus for executing a plurality of encipherment processes for enciphering original data of $2^n$ bits into enciphered data of $2^n$ bits, comprising:

memory means for storing original data, enciphered data produced by executing said encipherment processes on said original data, a pair of data blocks produced from the original data by executing said encipherment processes, each data block of said pair of data blocks having $2^{n-1}$ bits, said memory means including an accumulator for storing one of said pair of data blocks, said one data block being converted into an intermediate data block by executing said encipherment processes; and processing means for converting original data of $2^n$ bits into enciphered data of $2^n$ bits by executing said encipherment processes;

wherein said encipherment processes include:

a first encipherment process for deriving a first pair of data blocks from said original data block of $2^n$ bits;

a second encipherment process for storing one of said first pair of data blocks in said accumulator, and converting the other of said first pair of data blocks into first data by using first intermediate data obtained by arithmetically operating on said one of said first pair of data blocks stored on said accumulator, said first data and said one of said first pair of data blocks being stored as a second pair of data blocks in said memory means, said second encipherment process including a process for circular shifting of said data block stored in said accumulator by a first predetermined number of bits;

a third encipherment process for storing one of said second pair of data blocks in said accumulator, and converting the other of said second pair of data blocks into said second data using second intermediate data obtained by arithmetically operating on said one of said second pair of data blocks stored in said accumulator, said second data and said one of said second pair of data blocks being stored as a third pair of data blocks in said memory means, said third encipherment process including a process for circular shifting of said data block stored in said accumulator by a second predetermined number of bits; and a fourth encipherment process for deriving an enciphered data block of $2^n$ bits from said third pair of data blocks.

31. An apparatus according to claim 30, wherein said second encipherment process includes:

a process for arithmetically operating on said data block stored in said accumulator using a first encipher key, and said third encipherment process includes arithmetically operating on said data block stored in said accumulator using a second encipher key, each of said first and second encipher keys having $2^{n-1}$ bits and being stored in said memory means.

32. An apparatus according to claim 30, wherein said first encipherment process includes:

a step of converting the $2^{n-1}$ lower bits of said original data of $2^n$ bits into one of said first pair of data blocks by arithmetically operating on the $2^{n-1}$ lower bits of said original data using the $2^{n-1}$ upper bits of said original data block, said $2^{n-1}$ upper bits of said original data being used in said second encipherment process as the other of said first pair of data blocks.

33. An apparatus according to claim 30, wherein said first encipherment process includes:

a step of converting the $2^{n-1}$ upper bits of said original data of $2^n$ bits into one of said first pair of data blocks by arithmetically operating on the $2^{n-1}$ upper bits of said original data using the $2^{n-1}$ lower bits of said original data, said $2^{n-1}$ lower bits of said original data being used in said second encipherment process as the other of said first pair of data blocks.

34. An apparatus according to claim 30, wherein said fourth encipherment process includes:

a step of converting one of said third pair of data blocks into third data by arithmetically operating on said one of said third pair of data blocks using the other of said third pair of data blocks; and a step of producing said enciphered data of $2^n$ bits by combining said third data and said other of said third pair of data blocks.

35. An apparatus according to claim 30, wherein said fourth encipherment process includes:

a step of storing one of said third pair of data blocks in said accumulator;

a step of converting said one of said third pair of data blocks into third intermediate data by arithmetically operating on said one data block of said third pair of data blocks;

a step of converting the other of said third pair of data blocks into third data by arithmetically operating on said other data block of said third pair of data blocks using said third intermediate data, said third data block and said one data block of said third pair of data blocks being stored as a fourth pair of data blocks in said memory means;

a step of converting one of said fourth pair of data blocks into fourth data by arithmetically operating on said one data block of said fourth pair of data blocks using the other data block of said fourth pair of data blocks; and a step of producing said enciphered data of $2^n$ bits by combining said fourth data and said other data block of said fourth pair of data blocks.

36. An encipher method suitable for a $2^{n-1}$ bits processor enciphering an original data block of $2^n$ bits into an enciphered data block of $2^n$ bits, said $2^{n-1}$ bits processor including memory means for storing original data, enciphered data produced by executing a plurality of encipherment processes on said original data, and a pair of data blocks produced from $2^n$ bits original data by executing said encipherment processes, said memory means including an accumulator for storing one of said pair of data blocks, said one of said pair of data blocks being converted into an intermediate data block by executing one of said encipherment processes, and processing means for converting an original data block of $2^n$ bits into an enciphered data block of $2^n$ bits by executing said encipherment processes;

said encipher method comprising the steps of:

performing a first encipherment process by deriving a first pair of data blocks from said original data block of $2^n$ bits;

performing a second encipherment process by storing one of said first pair of data blocks in said accumulator, and converting the other of said first pair of data blocks into first data using first intermediate data obtained by arithmetically operating on said one of said first pair of data blocks stored in said accumulator, said first data and said one of said first pair of data blocks being stored as a second pair of data blocks in said memory means, said second encipherment process including circular shifting of the data block stored in said accumulator by a first predetermined number of bits;

performing a third encipherment process by storing one of said second pair of data blocks in said accumulator, and converting the other data block of said second pair of data blocks into second data using second intermediate data obtained by arithmetically operating on said one of said second pair of data blocks stored in said accumulator, said second data and said one of said second pair of data blocks being stored as a third pair of data blocks in said memory means, said third encipherment process including circular shifting of the data block stored in said accumulator by a second predetermined number of bits, which is different from said first predetermined number of bits; and performing a fourth encipherment process by deriving an enciphered data block of $2^n$ bits from said third pair of data blocks.

37. An encipher method according to claim 36, wherein said second encipherment process includes arithmetically operating on a data block stored in said accumulator using a first encipher key, and said third encipherment process includes arithmetically operating on a data block stored in said accumulator using a second encipher key, each of said first and second encipher keys having $2^{n-1}$ bits and being stored in said memory means.

38. An encipher method according to claim 36, wherein said first encipherment process includes:
   a step of converting the $2^{n-1}$ lower bits of said original data block of $2^n$ bits into one of said first pair of data blocks by arithmetically operating on the $2^{n-1}$ lower bits of said original data block using said $2^{n-1}$ upper bits of said original data block, said $2^{n-1}$ upper bits of said original data block being used in said second encipherment process as the other of said first pair of data blocks.

39. An encipher method according to claim 36, wherein said first encipherment process includes:
   a step of converting the $2^{n-1}$ upper bits of said original data block of $2^n$ bits into one of said first pair of data blocks by arithmetically operating on the $2^{n-1}$ upper bits of said original data block using said $2^{n-1}$ lower bits of said original data block, said $2^{n-1}$ lower bits of said original data block being used in said second encipherment process as the other of said first pair of data blocks.

40. An encipher method according to claim 36, wherein said fourth encipherment process includes:
   a step of converting one of said third pair of data blocks into third data by arithmetically operating on said one of said third pair of data blocks using the other of said third pair of data blocks; and
   a step of producing said enciphered data of $2^n$ by combining said third data and said other of said third pair of data blocks.

41. An encipher method according to claim 36, wherein said fourth encipherment process includes:
   a step of storing one of said third pair of data blocks in said accumulator;
   a step of converting said one of said third pair of data blocks into third intermediate data by arithmetically operating on said one of said third pair of data blocks;
   a step of converting the other of said third pair of data blocks into third data by arithmetically operating on said other of said third pair of data blocks using said third intermediate data, said third data block and said one of third pair of data blocks being stored as a fourth pair of data blocks in said memory means;
   a step of converting one of said fourth pair of data blocks into fourth data by arithmetically operating on said one of said fourth pair of data blocks using the other of said fourth pair of data blocks; and
   a step of producing said enciphered data of $2^n$ bits by combining said fourth data and said other of said fourth pair of data blocks.

* * * * *